US006542143B1

(12) United States Patent
Ozawa

(10) Patent No.: US 6,542,143 B1
(45) Date of Patent: *Apr. 1, 2003

(54) METHOD AND APPARATUS FOR DRIVING THE DISPLAY DEVICE, DISPLAY SYSTEM, AND DATA PROCESSING DEVICE

(75) Inventor: Tokuroh Ozawa, Suwa (JP)

(73) Assignee: Seiko Epson Corporation, Suwa (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/945,522

(22) PCT Filed: Feb. 28, 1997

(86) PCT No.: PCT/JP97/00609

§ 371 (c)(1), (2), (4) Date: Feb. 5, 1998

(87) PCT Pub. No.: WO97/32295

PCT Pub. Date: Sep. 4, 1997

(30) Foreign Application Priority Data

Feb. 28, 1996 (JP) ............................................ 8-067304

(51) Int. Cl.[7] ........................... G09G 3/36; H04N 5/202

(52) U.S. Cl. ............................. 345/98; 345/92; 345/89; 345/205; 348/674; 348/792

(58) Field of Search .............................. 345/87, 89, 92, 345/98, 101, 100, 58, 204, 205; 349/54, 49; 348/674, 790–793

(56) References Cited

U.S. PATENT DOCUMENTS

| | | | | | |
|---|---|---|---|---|---|
| 4,845,482 | A | * | 7/1989 | Howard et al. | 345/58 |
| 4,873,516 | A | * | 10/1989 | Castleberry | 345/58 |
| 5,250,931 | A | * | 10/1993 | Misawa et al. | 345/206 |
| 5,604,511 | A | * | 2/1997 | Ohi | 345/98 |
| 5,625,373 | A | * | 4/1997 | Johnson | 345/58 |
| 5,739,816 | A | * | 4/1998 | Kobayashi et al. | 345/204 |
| 5,764,216 | A | * | 6/1998 | Tanaka et al. | 348/674 |
| 5,796,384 | A | * | 8/1998 | Kim | 345/147 |
| 5,933,199 | A | * | 8/1999 | Yoon | 348/674 |
| 5,940,057 | A | * | 8/1999 | Lien et al. | 345/89 |
| 6,023,257 | A | * | 2/2000 | Koyama | 345/58 |

FOREIGN PATENT DOCUMENTS

| | | |
|---|---|---|
| GB | 2-217-128 A | 10/1989 |
| JP | A 57-052228 | 3/1982 |
| JP | A 58-097918 | 6/1983 |
| JP | A 59-107628 | 6/1984 |
| JP | A 62-10696 | 1/1987 |
| JP | U 63-82228 | 5/1988 |
| JP | A 1-233919 | 9/1989 |
| JP | A 3-35218 | 2/1991 |
| JP | A 3-89393 | 4/1991 |
| JP | A 3-190429 | 8/1991 |
| JP | A 3-214818 | 9/1991 |

(List continued on next page.)

*Primary Examiner*—Lun-Yi Lao
(74) *Attorney, Agent, or Firm*—Oliff & Berridge, PLC

(57) ABSTRACT

It is an object to provide a high-performance display element driving device or the like which can be easily reduced in power consumption and scale. A display element driving device (100) drives a liquid crystal serving as a capacitive display element. A D/A converter (110) includes first to Nth charge storage sections (112-1) to (112-N) for receiving first to Nth digital data corresponding an image signal and storing charges corresponding to the values of the first to Nth digital data, and first to Nth connection sections (114-1) to (114-N) for electrically connecting the first to Nth charge storing sections (112-1) to (112-N) and an electrode line (130) to each other and discharging the stored charges to the electrode line (130) at a given timing. In this manner, γ-correction of a liquid crystal and D/A conversion can be simultaneously performed, and conversion from RGB to YUV and D/A conversion can be simultaneously performed.

8 Claims, 23 Drawing Sheets

FOREIGN PATENT DOCUMENTS

| | | | |
|---|---|---|---|
| JP | A 4-11282 | | 1/1992 |
| JP | A 4-502520 | | 5/1992 |
| JP | 4-195189 | A * | 7/1992 |
| JP | A 4-268818 | | 9/1992 |
| JP | A 5-102857 | | 4/1993 |
| JP | A 5-281920 | | 10/1993 |
| JP | A 5-303080 | | 11/1993 |
| JP | A 6-059648 | | 3/1994 |
| JP | A 6-95619 | | 4/1994 |
| JP | A 6-152424 | | 5/1994 |
| JP | A 6-222741 | | 8/1994 |
| JP | A 6-268522 | | 9/1994 |
| JP | A 7-295520 | | 11/1995 |
| JP | A 7-295521 | | 11/1995 |
| JP | A 8-237125 | | 9/1996 |
| JP | A 8-286641 | | 11/1996 |

* cited by examiner

| Y7 | SELECTION VOLTAGE (CY7) |
|---|---|
| 0 | VC |
| 1 | VB-Y |

FIG. 13A

| U7 | SELECTION VOLTAGE (CU7) |
|---|---|
| 0 | VC |
| 1 | VB-U2(–) |

FIG. 13B

| U7 | U6 | T1 | T2 | T3 | T4 | SELECTION VOLTAGE (CU6) |
|---|---|---|---|---|---|---|
| 0 | 0 | 0 | 1 | 0 | 0 | VC |
| 0 | 1 | 1 | 0 | 1 | 0 | VB-U1(+) |
| 1 | 0 | 1 | 0 | 0 | 1 | VB-U2(–) |
| 1 | 1 | 0 | 1 | 0 | 0 | VC |

FIG. 13C

METHOD AND APPARATUS FOR DRIVING THE DISPLAY DEVICE, DISPLAY SYSTEM, AND DATA PROCESSING DEVICE

FIELD OF THE INVENTION

The present invention relates to a display driving device for driving a display element such as a liquid crystal, a display device including the display element driving device, an information processing apparatus including the display device, and a display element driving method.

DESCRIPTION OF THE RELATED ART

FIG. 21 shows a circuit of a conventional data driver disclosed in Japanese Unexamined Patent Publication No. 6-222741. In this data driver, by using voltages V1 to V9 having nine levels and externally driven, a 64-level applied voltages are applied to signal lines. The three upper bits of digital data of an image signal are converted into 8-value data by a decoder 923. Voltage selection circuits 927 and 925 select corresponding ones of the voltages V1 to V9 on the basis of the 8-value data, and output the selected voltages as VH and VL, respectively. The three lower bits of the digital data of the image signal are converted into 8-value data by a decoder 924. A resistor division scheme D/A converter 926 selects one of voltages obtained by equally dividing the voltages VH and VL by eight and outputs the selected voltage to a signal line as Vout. Even if the conventional arrangement is used, when the externally input voltages V1 to V9 are optimized in accordance with the γ characteristics of a liquid-crystal element, γ-correction can be performed to some extent.

However, since an output voltage is generated by interpolating the voltages V1 to V9 in the above method, the resultant output voltage is different from a voltage to be displayed in an original state, and display characteristics are degraded disadvantageously.

On the other hand, FIG. 22 shows a case wherein γ-correction is performed by using a data driver using an analog scheme. In this method, an image signal is converted into analog data by a D/A converter 930. A γ-correction circuit 934 performs a γ-correction process on the basis of the analog data and correction data from a γ-correction table ROM 932. Therefore, analog data subjected to γ-correction is input to an analog-type data driver 942 in a liquid-crystal display device 940.

However, the analog-type data driver 942 has high power consumption because an analog circuit must be incorporated in the data driver 942, and the data driver 942 is generally improper for a display of a portable computer.

In recent years, it is tried to integrally form the data driver 942 or the like on a substrate having a TFT (thin-film transistor) 944. When the TFT 944 is integrally formed, a considerable reduction in size of the liquid-crystal display device and a reduction in cost can be realized. When such integral formation is to be performed, an incorporated analog circuit must be also constituted by a TFT in the analog-type data driver. 942. However, when the analog circuit is constituted by a TFT, the following various problems are posed. That is, the transistor characteristics of the TFT change with time, or it is difficult to obtain desired performance. In addition, when it is tried to incorporate the γ-correction circuit 934 in the data driver 942, a large amount of current flows in the γ-correction circuit 934 serving as an analog circuit. For this reason, a problem of a change in transistor characteristics of a TFT with time is posed.

As described above, the conventional data driver has various problems.

Some information processing apparatus such as a multimedia terminal or a graphic accelerator do not process an RGB signal used in a liquid-crystal display device, but process an image signal called a YUV or processes both RGB and YUV. When the liquid-crystal display device is used as a display of the information processing apparatus, it is desired that both the image signals, i.e., RGB and YUV, can be displayed. For this purpose, in a conventional arrangement, a conversion circuit 950 as shown in FIG. 23 is arranged to convert a YUV signal into an RGB signal, D/A conversion is performed by the D/A converter 952, and analog data obtained by the D/A conversion is applied to a data driver 962.

However, in this arrangement, since an analog-type data driver must be used as the data driver 962, a problem about an increase in power consumption is also posed as described above. In addition, there is a problem of difficulty of the data driver 962 integrally formed on a substrate on which a TFT 964 is formed.

SUMMARY OF THE INVENTION

The present invention has been made to solve the above problems, and has as its object to provide a display element driving device, a display device, an information processing apparatus, and a display element driving method each of which can obtain a low power consumption, can be increased in scale, and exhibit high performance.

It is another object of the present invention to provide a display element driving device or the like which can compensate for the display characteristics of a display element with an arrangement having low power consumption and a small scale.

It is still another object of the present invention to provide a display element driving device or the like which can display image signals having different formats with an arrangement having a low power consumption and a small scale.

It is still another object of the present invention to provide a display element driving device or the like which is optimally integrated with a substrate on which a TFT and the like are formed.

In order to solve the above problems, according to the present invention, there is provided a display element driving device comprising a D/A converter for giving an applied voltage based on a given image signal to an electrode line electrically connected to the other side of a capacitive display element having one side to which a given voltage is applied.

The D/A converter includes first to Nth charge storage means for respectively receiving first to Nth digital data corresponding to the image signal and storing charges corresponding to the values of the first to Nth digital data first to Nth connection means for electrically connecting the first to Nth charge storage means and the electrode line to each other and discharging the charges stored in the first to Nth charge storage means to the electrode line at a given timing.

According to the present invention, for example, in case of N=2, a charge corresponding to the value of the first digital data and a charge corresponding to the value of the second digital data are stored in the first charge storage means and the second charge storage means. When the first and second connection means electrically connects the first and second charge storage means and the electrode line to each other, the charges stored in the first and second charge storage means are discharged to the electrode line. At this time, on the basis of the discharged charges, capacitances of, e.g., the display element, the electrode line, and the first and second charge storage means, and the like, an applied voltage to the electrode line is determined. According to the present invention, the moment D/A conversion is performed, processes such as addition and subtraction processes between the digital data are performed or the process multiplying the digital data by given coefficients can be performed.

The present invention is characterized in that the first to Nth charge storage means store the charges on the basis of the first to Nth digital data can be performed and at least one given voltage. In this manner, when various-given voltages are prepared, or a given voltage is changed, not only a simple addition process of digital data but also various processes such as a subtraction process, a multiplication process of a coefficient can be easily performed.

The present invention is characterized in that the first to Nth charge storage means include capacitor elements having one sides to which a given voltage is applied and capacitances which are binarily weighted, and the first to Nth connection means include switches for electrically connecting the other sides of the capacitive elements and the electrode line to each other at once. When the capacitances of the capacitor elements are binarily weighted at, e.g., 1:2:4:8 . . . , an addition process, a subtraction process, and the like of digital data can be easily performed.

The present invention is characterized in that the first to Nth charge storage means select at least one capacitor element for storing a charge from the capacitor elements on the basis of the first to Nth digital data, and store a charge in the selected capacitor element at at least one given voltage. For example, given voltages V1, VC, and −V1 (V1−VC=VC−(−V1)), the first charge storage means selects a capacitor element for storing a charge by V1 and VC on the basis of the first digital data, and the second charge storage means selects a capacitor element for storing a charge by −V1 and VC, thereby making it possible to perform a subtraction process or the like. When the given voltages to the first to Nth charge storage means are made different from each other, a display element driving device which has a small scale and is not adversely affected by a variation in manufacturing process can be realized.

The present invention is characterized in that digital data having the complementary format of 2 is input as the first to Nth digital data, and the capacitance of the capacitor element corresponding to an MSB of digital data of capacitor elements included in at least one of the first to Nth charge storage means is made equal to the capacitance of a capacitor element corresponding to an LSB. For example, when digital data to be added is negative, a charge is stored in a capacitor corresponding to the MSB (Most Significant Bit), so that a subtraction process or the like of digital data having the complementary format of 2 can be realized.

According to the present invention, there is provided a display element driving device comprising a D/A converter for giving an applied voltage based on a given image signal to an electrode line electrically connected to the other side of a capacitive display element having one side to which a given voltage is applied, characterized in that the D/A converter includes first charge storage means for receiving image digital data corresponding to the image signal and storing a charge corresponding to the value of the image digital data, second charge storage means for receiving correction digital data for compensating for the display characteristics of the display element and storing a charge corresponding to the value of the correction digital data, first correction means for electrically connecting the first charge storage means and the electrode line to each other and discharging the charge stored in the first charge storage means to the electrode line at a given timing, and second connection means for electrically connecting the second charge storage means and the electrode line to each other and discharging the charge stored in the charge storage means to the electrode line at the same timing as the given timing.

According to the present invention, D/A conversion of image digital data, a γ-correction process of a liquid crystal, and the like, can be simultaneously performed. In addition, the correction process can be accurately performed, and reductions in power consumption and reduction in scale of the device can also be performed.

The present invention is characterized in that when a change value of the applied voltage obtained when the LSB of the image digital data changes is represented by V1, and a change value of the applied voltage obtained when the LSB of the correction digital data changes is represented by V2, a relationship V1>2×V2 is established. In this manner, a state wherein an applied voltage decreases with respect to an increase in image digital data is prevented, and normal gradation expression can be performed.

The present invention is characterized in that when the number of bits of the image digital data is represented by m, and the number of bits of the correction digital data is represented by n, a relationship m≧n is established. In this manner, the display element driving device can be reduced in area while making normal gradation expression possible.

According to the present invention, there is provided a display element driving device for giving applied voltages VR1, VG1, and VB1 generated on the basis of digital data DY1, DU1, and DV1 of a YUV signal to electrode lines for red, green, and blue to which display elements are respectively electrically connected, characterized by comprising a first D/A converter for respectively receiving the digital data DY1 and DV1 and generating an applied voltage VR1 to the electrode line for red by conversion according to a relational expression VR1=aDY1+bDV1, a second D/A converter for respectively receiving the digital data DY1, DU1, and DV1 and generating an applied voltage VG1 to the electrode line for green by conversion according to a relational expression VG1=cDY1+dDU1+eDV1, and a third D/A converter for respectively receiving the digital data DY1 and DU1 and generating an applied voltage VB1 to the electrode for blue by conversion according to a relational expression VB1=fDY1+gDU1.

According to the present invention, D/A conversion, a conversion process from YUV to RGB, and the like can be simultaneously performed. In this manner, a display element driving device which is optimum for an information processing apparatus or the like using a YUV signal can be provided. According to the present invention, various types of YUV signals such as YUV422 or YUV411 signals can be converted into RGB signals.

The present invention is characterized by comprising a fourth D/A converter for respectively receiving digital data DY2 for generating VR2, VG2, and VB2 given to second electrode lines for red, green, and blue adjacent to the electrode lines for red, green, and blue and the digital data DV1 and generating an applied voltage VR2 to the second electrode line for red by conversion according to a relational expression VR2=aDY2+bDV1, a fifth D/A converter for respectively receiving the digital data DY2, DU1, and DV1 and generating an applied voltage VG2 to the second electrode line for green by conversion according to the relational expression VG2=cDY2+dDU1+eDV1, and a sixth D/A converter for respectively receiving the digital data DY2 and DU1 and generating an applied voltage VB2 to the second electrode line for blue by conversion according to a relational expression VB2=fDY2+gDU1. In this manner, a display element driving device having an arrangement which is optimum for conversion of a YUV signal, especially, in a YUV422 scheme can be provided.

The present invention is characterized in that the respective coefficients a, b, c, d, e, f, and g are determined by at least one given voltage and the capacitance of a capacitor element which is incorporated in the D/A converter and in which a charge is stored by the given voltage. As described above, when the D/A converters incorporate the capacitor elements, the coefficients a to g are preferably determined by the capacitances (e.g., total capacitance or capacitance corresponding to the LSB of digital data) of the capacitor elements and the given voltages.

The present invention is characterized in that the capacitances of the capacitor elements for determining the respective coefficients a, b, c, d, e, f, and g are made equal to each other, and the voltages for determining the respective coefficients a, b, c, d, e, f, and g are made different from each other. For example, when capacitances Ca to Cg for determining the coefficients a to g are equally set to CEQ, and voltages Va to Vg for determining the coefficients a to g are made different from each other, the coefficients a to g can be set to values which are different from each other. When the coefficient ratio is not an integer, this method is preferable because the method which can make the capacitances Ca to Cg equal to each other is not easily adversely affected by variation in manufacturing process.

The present invention is characterized in that the voltages for determining the respective coefficients a, b, c, d, e, f, and g are made equal to each other, and the capacitances of the capacitor elements for determining the respective coefficients a, b, c, d, e, f, and g are made different from each other. For example, when the voltage Va to Vg for determining the coefficients a to g are equally set to VEQ, and the capacitances Ca to Cg for determining the coefficients a to g are made different from each other. The coefficients a to g can be set to values which are made different from each other.

The present invention is characterized in that the display element is a capacitive display element having one side to which a given voltage is applied; the first D/A converter includes first and second charge storage means for respectively receiving DY1 and DV1 and storing charges according to the values of the DY1 and DV1 and first and second connection means for electrically connecting. The first and second charge storage means and the electrode line for red to each other and discharging the charges stored in the first and second charge storage means to the electrode line for red at a given timing; the second D/A converter includes third, fourth, and fifth charge storage means for respectively receiving DY1, DU1, and DV1 and storing charges according to the values of the DY1, DU1, and DV1 and third, fourth, and fifth connection means for electrically connecting the third, fourth, and fifth charge storage means. The electrode line for green to each other and discharging the charges stored in the third, fourth, and fifth charge storage means to the electrode line for green at a given timing; and the third D/A converter includes sixth and seventh charge storage means for respectively receiving DY1 and DU1 and storing charges according the values of the DY1 and DU1 and sixth and seventh connection means for electrically connecting the sixth and seventh charge storage means and the electrode line for blue to each other and discharging the charges stored in the sixth and seventh charge storage means to the electrode line for blue at a given timing. When the first to seventh charge storage means and the first to seventh connection means are arranged as described above, D/A conversion and conversion from YUV to RGB can be realized at a low power consumption with a relatively simple arrangement.

The present invention is characterized in that the display element is a capacitive display element having one side to which a given voltage is applied; the first D/A converter includes first and second charge storage means for respectively receiving DY1 and DV1 and storing charges according to the values of the DY1 and DV1 and first and second connection means for electrically connecting. The first and second charge storage means and the electrode line for red to each other and discharging the charges stored in the first and second charge storage means to the electrode line for red at a given timing; the second D/A converter includes third, fourth, and fifth charge storage means for respectively receiving DY1, DU1, and DV1 and storing charges according to the values of the DY1, DU1, and DV1 and third, fourth, and fifth connection means for electrically connecting. The third, fourth, and fifth charge storage means and the electrode line for green to each other and discharging the charges stored in the third, fourth, and fifth charge storage means to the electrode line for green at a given timing; the third D/A converter includes sixth and seventh charge storage means for respectively receiving DY1 and DU1 and storing charges according the values of the DY1 and DU1 and sixth and seventh connection means for electrically connecting. The sixth and seventh charge storage means and the electrode line for blue to each other and discharging the charges stored in the sixth and seventh charge storage means to the electrode line for blue at a given timing; the fourth D/A converter includes eighth and ninth charge storage means for respectively receiving DY2 and DV1 and storing charges according to the values of the DY2 and DV1 and eighth and ninth connection means for electrically connecting. The eighth and ninth charge storage means to the second electrode line for red to each other and discharging the charges stored in the eighth and ninth charge storage means to the second electrode line for red at a given timing; the fifth D/A converter includes tenth, eleventh, and twelfth charge storage means for respectively receiving DY2, DU1, and DV1 and storing charges according to the values of the DY2, DU1, and DV1 and tenth, eleventh, and twelfth connection means for electrically connecting the tenth, eleventh, and twelfth charge storage means. The second electrode line for green to each other and discharging the charges stored in the tenth, eleventh, and twelfth to the second electrode line for green at a given timing; and the sixth D/A converter includes thirteenth and fourteenth charge storage means for respectively receiving DY2 and DU1 and storing charges according to the values of the DY2 and DU1 and thirteenth and fourteenth connection means for electrically connecting the thirteenth and fourteenth charge storage means and the second electrode line for blue to each other and discharging the charges stored in the thirteenth and fourteenth charge storage means to the electrode line for blue at a given timing. When the first to fourteenth charge storage means and the first to fourteenth connection means are arranged as described above, D/A conversion and conversion from YUV to RGB can be realized at a low power consumption with a relatively simple arrangement.

The present invention is characterized in that digital data DR1, DG1, and DB1 of a RGB signal are further given, and a YUV mode for generating applied voltages VR1, VG1, and VB1 on the basis of the digital data DY1, DU1, and DV1 and an RGB mode for generating the applied voltages VR1, VG1, and VB1 on the basis of the digital data DR1, DG1, and DB1 are set.

According to the present invention, not only conversion from YUV to RGB but also D/A conversion of RGB digital data can also be performed. In this manner, a display element driving device which is optimum for an information processing apparatus or the like in which both YUV and RGB are set can be provided.

The present invention is characterized by comprising means for, in the RGB mode, inputting DR1 to the first D/A converter in place of DY1 and DV1, inputting DG1 to the second D/A converter in place of DY1, DU1 and DV1, and inputting DB1 to the third D/A converter in place of DY1 and DU1. In this manner, both the conversion processes in the RGB mode and the YUV mode can be realized by the first to third D/A converters, hardware resources can be effectively used.

The present invention is characterized in that digital data DR1, DG1, DB1, DR2, DG2, and DB2 of an RGB signal are further given, and a YUV mode for generating applied voltages VR1, VG1, VB1, VR2, VG2, and VB2 on the basis of the digital data DY1, DU1, DV1, and DY2 and an RGB mode for generating applied voltages VR1, VG1, VB1, VR2, VG2, and VB2 on the basis of the digital data DR1, DG1, DB1, DR2, DG2, and DB2 are arranged. In this manner, a display element driving device which is optimum for an information processing apparatus or the like in which both YUV422 and RGB are set can be provided.

The present invention is characterized by comprising means for, in the RGB mode, inputting DR1 to the first D/A converter in place of DY1 and DV1, inputting DG1 to the second D/A converter in place of DY1, DU1 and DV1, inputting DB1 to the third D/A converter in place of DY1 and DU1, inputting DR2 to the fourth D/A converter in place of DY2 and DV1, inputting DG2 to the fifth D/A converter in place of DY2, DU1, and DV1, and inputting DB2 to the sixth D/A converter in place of DY2 and DU1. In this manner, especially in conversion of a YUV signal in a YUV422 scheme, hardware resources can be effectively used.

According to the present invention, there is provided a display element driving device for giving first and second applied voltages for red, blue, and green generated on the basis of digital data of a YUV signal to first and second electrode lines for red, green, and blue to which display elements are respectively electrically connected, characterized by comprising a first transfer line for sequentially transferring digital data DY1, DY2, DY3, DY4 . . . DY2K−1 DY2k . . . DYL of the YUV signal, a second transfer line for sequentially transferring digital data DV1, DU1, DV2, DU2 . . . DVK, DUK . . . DVL/2, DUL/2 or DU1, DV1, DU2, DV2 . . . DUK, DVK . . . DUL/2, DVL/2 of the YUV signal, a first latch for latching DY2k−1 of the first transfer line, a second latch for latching DVK or DUK of the second transfer line at a timing which is substantially the same as that of the first latch, a third latch for latching DUK or DVK of the second transfer line, a fourth latch for latching DY2K of the first transfer line at a timing which is substantially the same as that of the third latch, and first to sixth D/A converters for generating first and second applied voltages for red, green, and blue on the basis of DY2k−1, DVK, DUK, and DY2K latched by the first to fourth latches.

According to the present invention, data can be caused to flow in the first and second transfer lines without any loss, and data transfer to the first to sixth D/A converters without any loss. For this reason, power consumption and scale of the device can be reduced.

The display device according to the present invention is characterized by comprising one of the display element driving device described above and a display element driven by the display element driving device. The display device according to the present invention further includes a substrate on which a switching element consisting of a thin-film transistor or a thin-film non-linear element is formed, characterized in that the display element driving device is integrally formed on the substrate. When the display element driving device is integrally formed on the substrate as described above, the display device can be reduced in outside dimension and cost.

According to the present invention, there is provided a display device comprising a display element driving device, a display element driven by the display element driving device, and a substrate on which a switching element consisting of a thin-film transistor or a thin-film non-linear element is formed, characterized in that the display element driving device includes a D/A converter for receiving image digital data and correction digital data for compensating for the display characteristics of the display element and outputting an applied voltage subjected to a correction process, and the display element driving device is integrally formed on the substrate.

According to the present invention, since the display element driving device can be integrally formed on the substrate of the TFT, the device can be reduced in scale and cost. The circuit in the display element driving device can be entirely constituted by a digital-based circuit, and the design for the display element driving device can be simplified.

The information processing apparatus according to the present invention is characterized by comprising any one of the display devices described above and at least one image signal output device for outputting an image signal given to the display device. The information processing apparatus according to the present invention comprises a display element driving device, a display device including a display element driven by the display element driving device, a first image signal output device for outputting digital data of a YUV signal, and a second image signal output device for outputting digital data of an RGB signal, and is characterized in that the display element driving device includes means for directly converting the digital data of the YUV signal into analog applied voltages for red, green, and blue to output the analog applied voltages when the digital data of the YUV signal is input, and converting the digital data of the RGB signal into analog applied voltages for red, green, and blue to output the analog applied voltages when the digital data of the RGB signal is input. In this manner, the display element driving device can be entirely constituted by a digital-based circuit, and an information processing apparatus in which both RGB and YUV are set can be reduced in power consumption and size.

BRIEF DESCRIPTION OF THE DRAWINGS

FIGS. 13A to 13C are truth tables for explaining an operation of the arrangement in FIG. 11.

DETAILED DESCRIPTION OF THE PREFERRED EMBODIMENT

Embodiment 1

Figure 1:
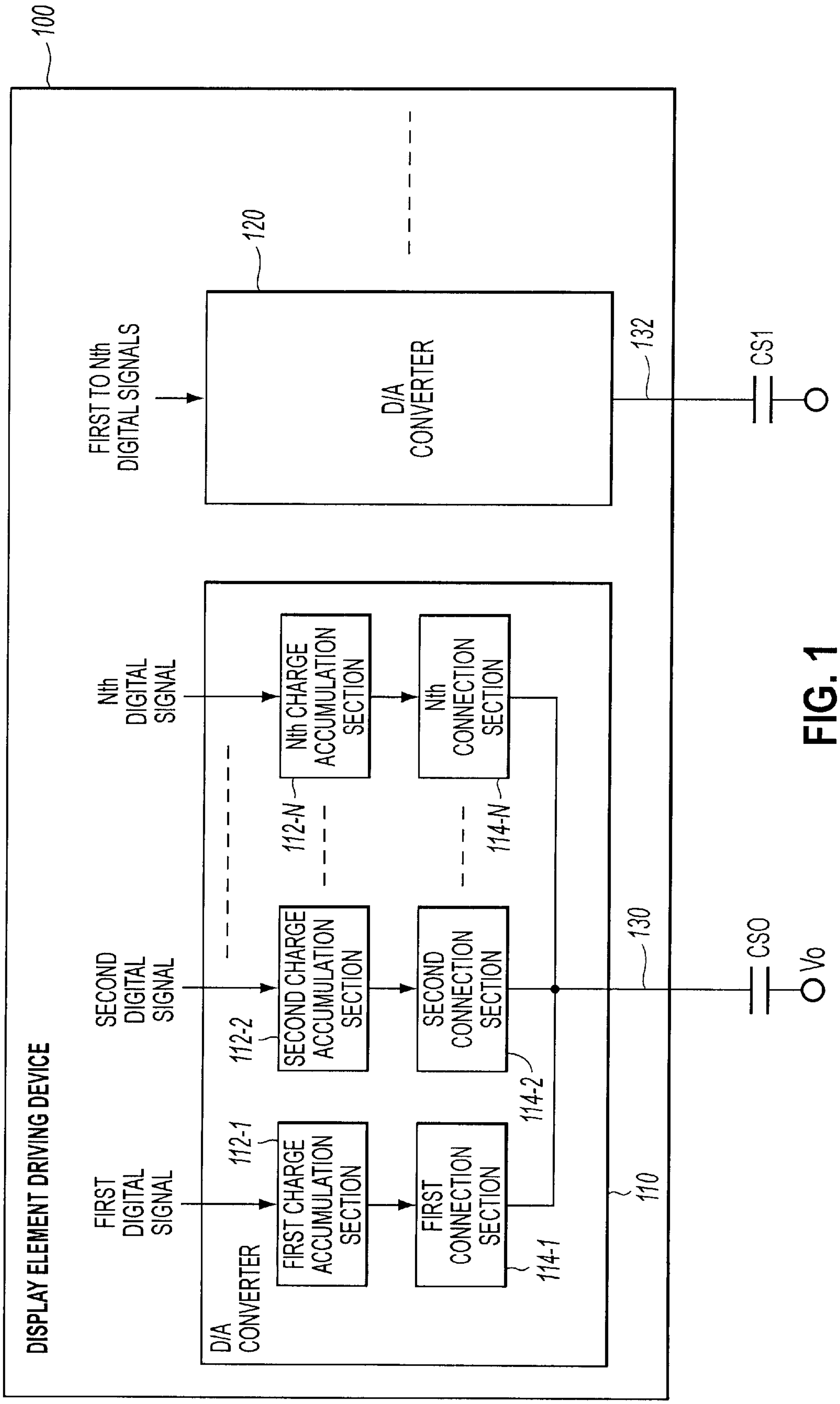
FIG. 1 is a view showing the arrangement of Embodiment 1.

FIG. 1 shows the arrangement of Embodiment 1. A display element driving device according to Embodiment 1 includes a plurality of D/A converters 110 and 120 and the like. A D/A converter 110 is to give an applied voltage based on a given image signal to an electrode line 130, and a capacitive display element having one side to which a given voltage V0 is applied is electrically connected to the electrode line 130. In FIG. 1, the capacitor of the display element, the capacitor which is parasitic in the electrode line 130, and the like are represented by CSO. The electrode line 130 may be electrically connected to the display element, or a transistor element, a switch element, a resistor element, or the like and may be interposed between the electrode line 130 and the display element.

The D/A converter 110 includes first to Nth charge storage sections 112-1 to 112-N and first to Nth connection sections 114-1 to 114-N. The first to Nth charge storage sections 112-1 to 112-N receive first to Nth digital data corresponding an image signal, and store charges corresponding to the values of the first to Nth digital data.

In this case, the first to Nth digital data may correspond to at least an image signal, and the first to Nth digital data are not necessarily digital data obtained by only converting the image signal. More specifically, the first to Nth digital data include various digital data such as digital data generated on the basis of, e.g., an image signal or digital data for correcting the image signal.

Amounts of charge stored in the first to Nth charge storage sections 112-1 to 112-N may correspond to the values of at least the first to Nth digital data, and the amounts are not necessarily proportional to the values of the first to Nth digital data. For example, the amounts of stored charge may be determined on the basis of the first to Nth digital data and one given voltage or a plurality of given voltages. More specifically, the following various methods may be used: any one of the plurality of given voltages is selected on the basis of the first to Nth digital data, and charges are stored depending on the selected voltage; charges corresponding to multiplication values between the first to Nth digital data and a given voltage are stored; or the like.

The first to Nth connection sections 114-1 to 114-N electrically connect the first to Nth charge storage sections 112-1 to 112-N and the electrode line 130 to each other, and discharge charges stored in the first to Nth charge storage sections 112-1 to 112-N to the electrode line 130 at a given timing. At this time, the first to Nth charge storage sections 112-1 to 112-N desirably discharge the stored charges to the electrode line 130 at substantially the same timing. When the charges are discharged to the electrode line 130, an applied voltage on the electrode line 130 is determined on the basis of the charge amounts, the capacitance of CSO, the capacitances of the first to Nth charge storage sections 112-1 to 112-N, and the like. The applied voltage is given to the display element to drive the display element. The other D/A converters such as a D/A converter 120 have the same arrangements as that of the D/A converter 110 and generate applied voltages to other electrode lines such as an electrode line 132.

Figure 2:
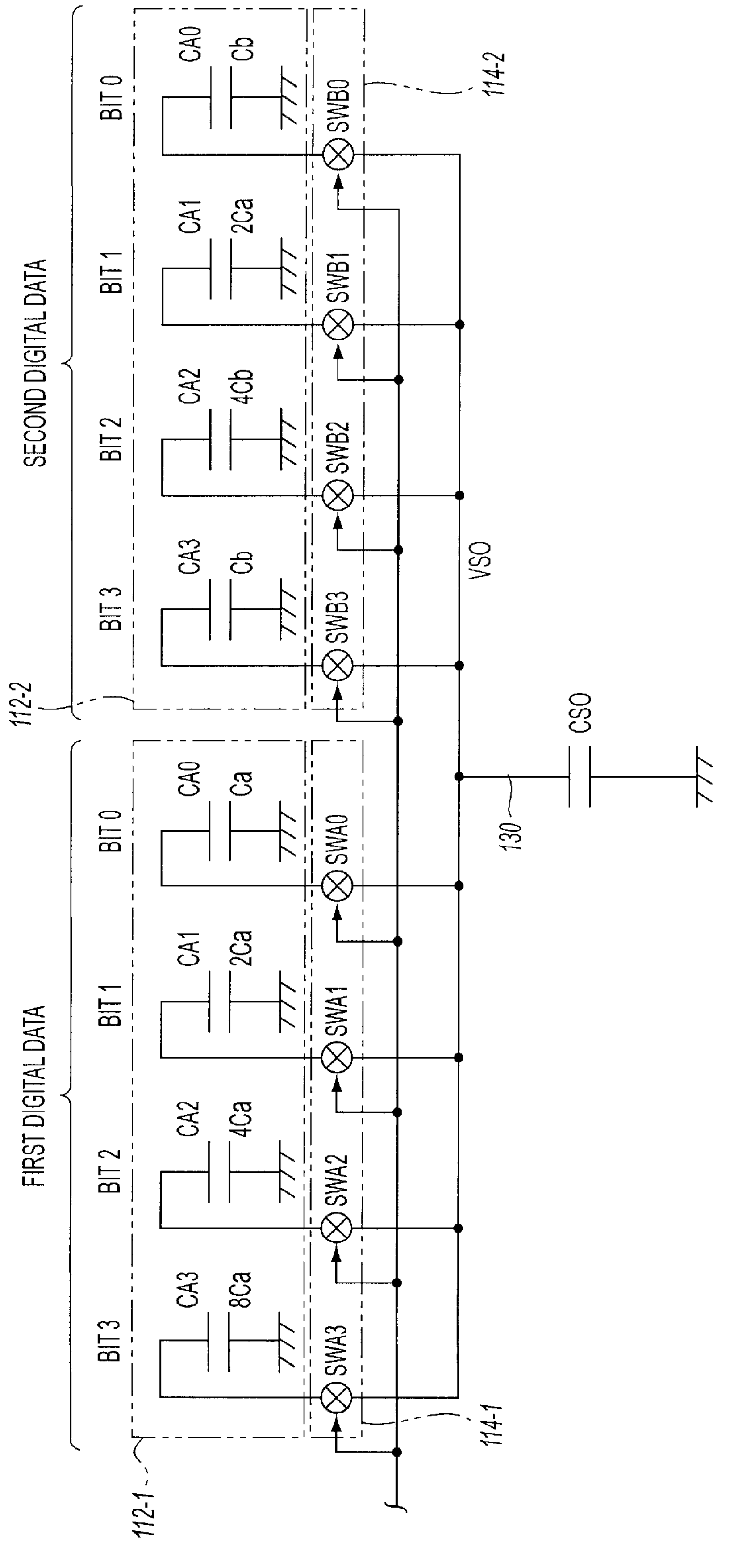
FIG. 2 is a view showing a concrete arrangement of a charge storage section and a connection section.

FIG. 2 is a view showing a concrete arrangement of a charge storage section and a connection section. The first and second charge storage sections 112-1 and 112-2 include capacitors (capacitor elements) CA0 to CA3 and CB0 to CB3 each having one side to which a given voltage is applied. The first and second connection sections 114-1 and 114-2 include switches SWA0 to SWA3 and SWB0 to SWB3 for electrically connecting the electrode lines 130 and the capacitors CA0 to CA3 and CB0 to CB3 to each other at a given timing at once. Here, the capacitances of the capacitors CA0 to CA3 are binarily weighted. In FIG. 2, the ratio of the capacitances is given by Ca: 2Ca: 4Ca: 8Ca= 1:2:4:8. The capacitances of the capacitors CB0 to CB3 are binarily weighted, and the ratio of the capacitances is given by Cb: 2Cb [4C]b:Cb=1:2:4:1. The capacitance of the capacitor CB3 is set to Cb which is equal to that of the capacitor CB0 to make it possible to perform subtraction using the complementary format of 2 (to be described later). An applied voltage VS0 to the electrode line 130 is initialized to 0 V.

A case wherein $(0101)_2=5$ is given by the first digital data and $(0010)_2=2$ is given by the second digital data will be considered. Referring to FIG. 2, one capacitor or a plurality of capacitors for storing charges is selected on the basis of the values of the first and second digital data, and a charge is stored in the selected capacitor depending on one given voltage or a plurality of given voltages. In this example, since the first digital data is $(0101)_2$, CA2 and CA0 are selected, Va serving as a given voltage is applied to CA2 and CA0, a voltage of 0 V is applied to other capacitors. On the other hand, since the second digital data is $(0010)_2$, CB1 is selected, Vb serving as a given voltage is applied to CB1, and a voltage of 0 V is applied to other capacitors. After charges are stored in the capacitors of the first and second charge storage sections 112-1 and 112-2, when the switches of the first and second connection sections 114-1 and 114-2 are turned on, the applied voltage VS0 to the electrode line 130 changes from 0 V serving as an initial value to the value expressed by the following equations:

$$VS0 = D1/D2 \tag{1}$$

$$\begin{aligned} D1 &= (4Ca + Ca) \times Va + 2Cb \times Vb \\ &= 5Ca \times Va + 2Cb \times Vb \end{aligned}$$

$$D2 = (8Ca + 4Ca + 2Ca + Ca) + (Cb + 4Cb + 2Cb + Cb) + CS0 \tag{2}$$

As is apparent from the above equations, since the denominator D2 is constant without depending on the first and second digital data, the magnitude of the VS0 depends on the numerator D1. More specifically, when the values of the first and second digital data, Ca, Cb, Va, and Vb are set to various values, respectively, VS0 having various values can be obtained. For example, when Ca=Cb and Va=Vb, D1=7Ca×Va is satisfied, and VS0 corresponding to the sum of values of the first and second digital data. According to this embodiment, D/A conversion and an addition process of the first and second digital data can be simultaneously performed.

A case wherein $(0101)_2=5$ is given by the first digital data and $(1110)_2=-2$ is given by the second digital data will be considered. In this case, digital data in the complementary format of 2 are input as the first and second digital data. Since the first digital data is $(0101)_2$, CA2 and CA0 are selected as in the above description, Va is applied to the CA2 and CA0. On the other hand, since the second digital data $(1110)_2$ is a negative number because bit 3 serving as the MSB (Most Significant Bit) is 1. Therefore, the difference between $(1110)_2$ and $(1111)_2$ is set, or $(1110)_2$ is inverted to generate $(0001)_2$. Bit 0 of the obtained digital data is 1, so that CB0 is selected. In addition, in this embodiment, CB3 having a capacitance equal to that of CB0 corresponding to bit 0 serving as the LSB (Least Significant Bit) is also selected. A negative voltage −Vb is applied to the CB0 and CB3. In this case, the applied voltage VS0 is given by the following equations:

$$VS0 = D3/D4 \tag{3}$$

$$\begin{aligned} D3 &= (4Ca + Ca) \times Va + (Cb + Cb) \times (-Vb) \\ &= 5Ca \times Va + 2Cb \times Vb \end{aligned}$$

-continued $$D4 = (8Ca + 4Ca + 2Ca + Ca) + (Cb + 4Cb + 2Cb + Cb) + CS0 \tag{4}$$

In this case, the value of the denominator is not different from the D2, and D4=D2 is satisfied. When Ca=Cb and Va=Vb, D3=5Ca×Va−2Ca×Va=3Ca×Va is satisfied. More specifically, according to this embodiment, not only an addition process but also a subtraction process (addition of a negative number) can be performed, D/A converter and the addition/subtraction process can be simultaneously performed.

In particular, in this embodiment, when the capacitance of CB3 corresponding to the MSB of the CB3 to CB0 is made equal to CB0 corresponding to the LSB, subtraction in the complementary format of 2 can be performed. More specifically, when subtraction in the complementary format of 2 is performed as is well known, data is inverted, and 1 (corresponding to LSB) must be added. In this case, a method of arranging another capacitor for adding 1 may be used. However, this method increases the circuit scale. In this embodiment, the addition process of 1 is performed using CB3. When the second digital data is a negative number, bit 3 becomes 1; when the second digital data is entirely inverted, bit 3 becomes 0. Therefore, in the subtraction (addition of a negative number) process, in general, charge need not be discharged from the CB3. In this embodiment, CB3 which is not used in the addition process of a negative number is effectively used, and the addition process of 1 is performed by using the CB3 so that the device is reduced in scale.

As described above, it is the first characteristic feature of this embodiment that D/A converter of digital data and various processes such as addition and subtraction processes between digital data or a multiplication process of a coefficient can be simultaneously performed. Therefore, as will be described later, for example, D/A conversion and γ-correction, or D/A conversion and YUV/RGB conversion can be simultaneously performed. As a result, γ-correction, YUV/RGB conversion, and the like can be performed by a digital processing system, and the device can be reduced in scale and power consumption.

It is a second characteristic feature that a display element is driven by effectively using that the display element to be driven is a capacitive element. More specifically, it is the second characteristic feature that an applied voltage applied to the electrode line is determined on the basis of the display element, the capacitance or the like of the electrode line, and charge discharged from the charge storage section. In this manner, a waste current such as a bias current flowing in an operational amplifier need not be consumed, and the power consumption of the device can be reduced. A display element driving device which is optimum for a portable display can be provided.

It is a third characteristic feature of this embodiment that the capacitance of the electrode line during a discharging operation of charge can be made constant without depending on the values of the first to Nth digital data. More specifically, as described in Equations (2) and (4), the values of denominators D2 and D4 are always kept constant without depending on the values of the digital data. Therefore, according to this embodiment, the value of an applied voltage given to the electrode line can be determined with a simple arrangement and simple control.

Embodiment 2

Embodiments 2 to 6 (to be described below) mainly exemplify a case wherein the present invention is applied to a data driver (display element driving device) for driving a liquid crystal (display element), a liquid-crystal display device (display device) including the data driver, an information processing apparatus including the liquid-crystal display device, and a liquid-crystal driving method (display element driving method).

Figure 3:
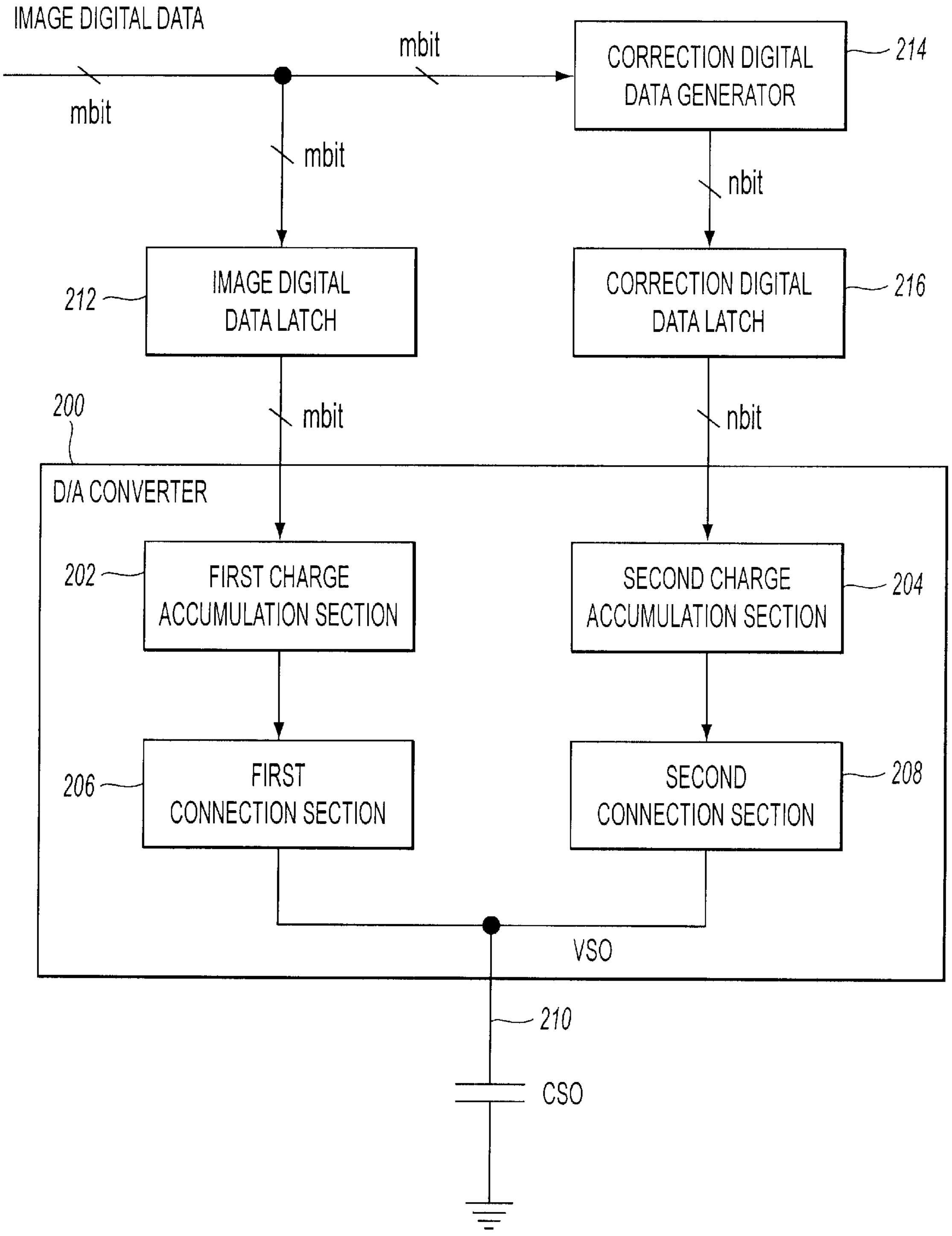
FIG. 3 is a view showing the arrangement of Embodiment 2.

Embodiment 2 is an embodiment wherein D/A converter and correction of the display characteristics of a liquid crystal are simultaneously performed. The arrangement of this embodiment is shown in FIG. 3. The m-bit digital data corresponding to an image signal is latched by an image digital data latch 212. A correction digital data generator 214 generates correction digital data on the basis of the image digital data. Generation of the correction digital data can be realized by using a memory such as a γ-correction ROM or a circuit or the like for performing an arithmetic operation according to a given arithmetic equation (sin wave or the like). When the γ-correction ROM is used, the γ characteristics of a liquid crystal may be actually measured to construct a γ-correction table for outputting correction digital data using image digital data as an address on the ROM. The generated correction digital data is latched by a correction digital data latch 216.

A D/A converter 200 includes first and second charge storage sections 202 and 204 and first and second connection sections 206 and 208. The first and second charge storage sections 202 and 204 receive image digital data and correction digital data and store charges corresponding to these data. The first and second connection sections 206 and 208 discharge the stored charges to a signal line (electrode line) 210 at a given timing. In this manner, according to the principle of Embodiment 1 described above, the applied voltage VS0 subjected to γ-correction can be applied to the signal line 210. Although not shown in FIG. 3, a D/A converter having the above arrangement is also connected to a signal line other then the signal line 210.

Figure 4A:
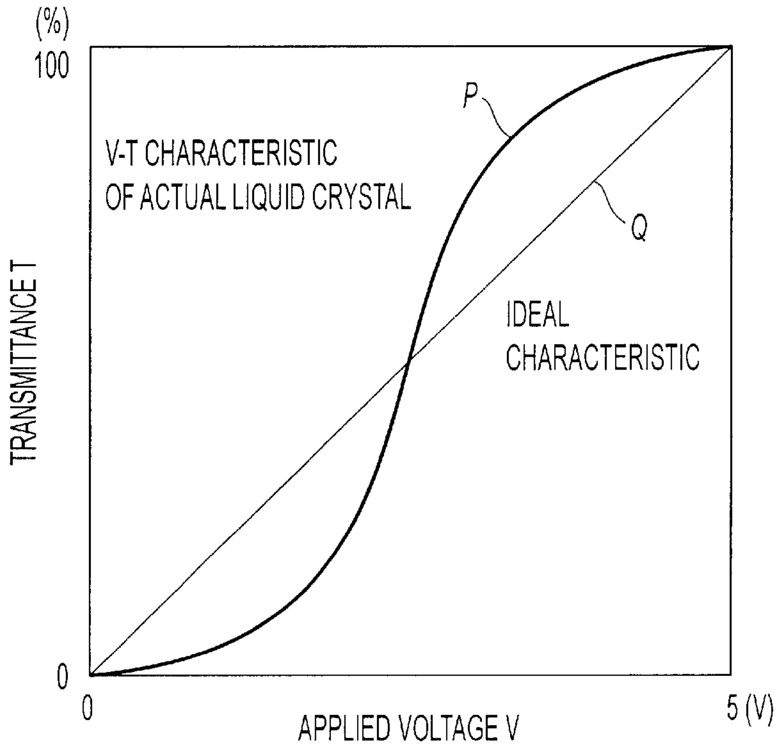
FIG. 4A is a graph showing the relationship between an applied voltage and the transmittance of a liquid crystal.
Figure 4B:
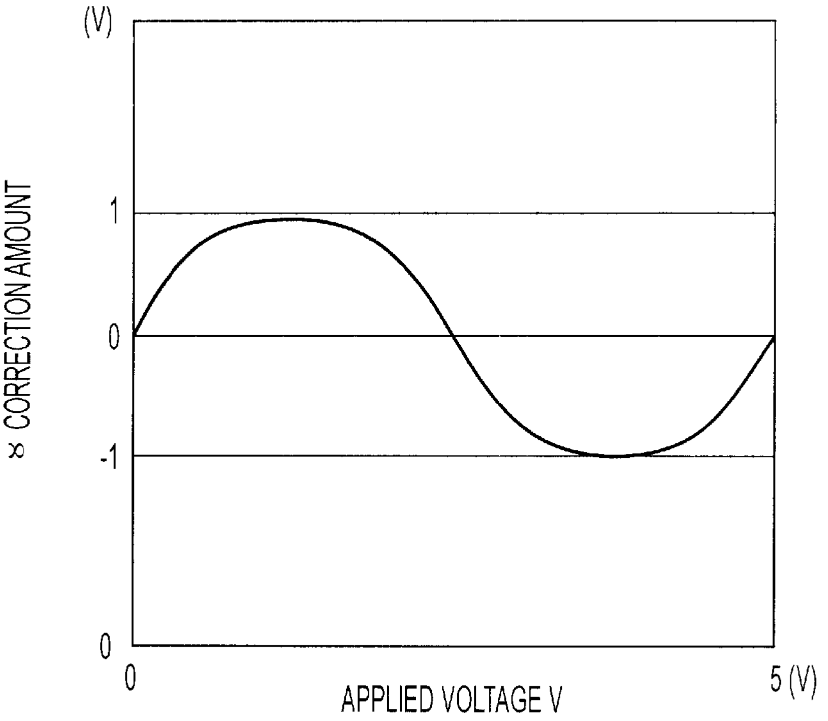
FIG. 4B is a graph showing the relationship between an applied voltage and a γ-correction value.

In FIG. 4A, P indicates an example of V (applied voltage)–T (transmittance) characteristics of a liquid crystal. As described above, in an actual liquid crystal, the transmittance does not linearly change with respect to a change in applied voltage. For this reason, when a γ-correction process is performed, ideal characteristics indicated by Q can be obtained. FIG. 4B shows the relationship between the applied voltage and a γ-correction amount required to obtain ideal characteristics.

Figure 5A:
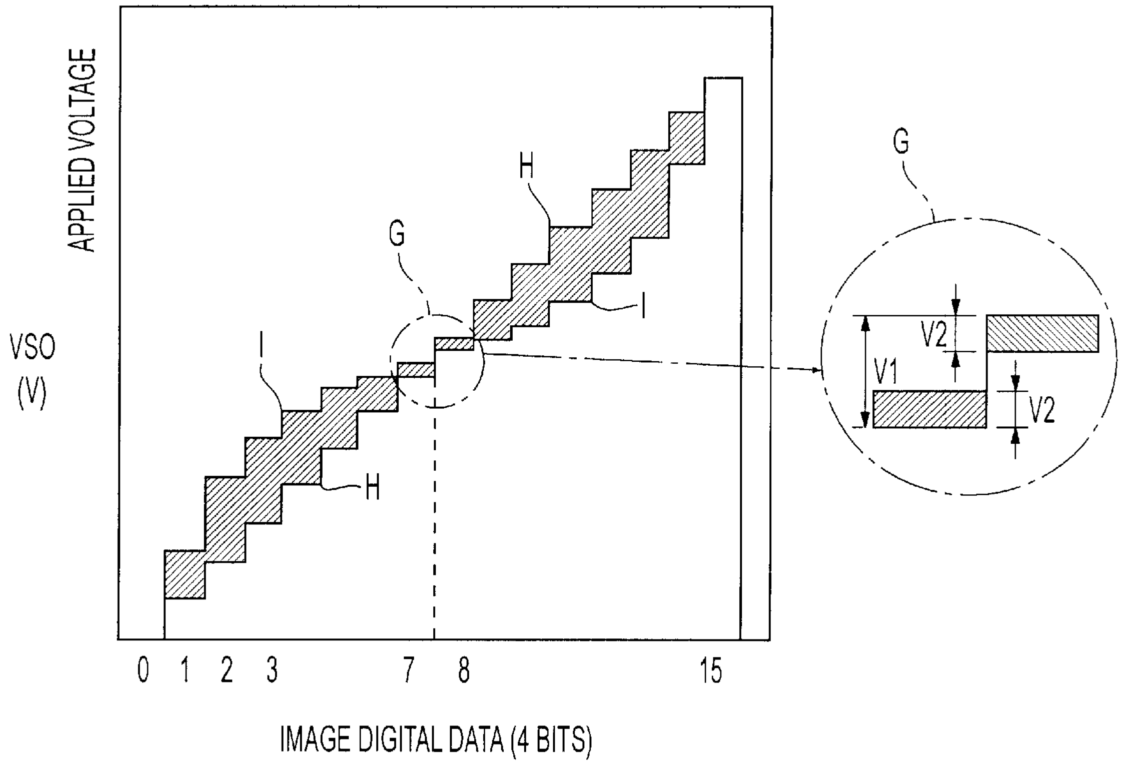
FIG. 5A is a graph showing the relationship between image digital data and an applied voltage.
Figure 5B:
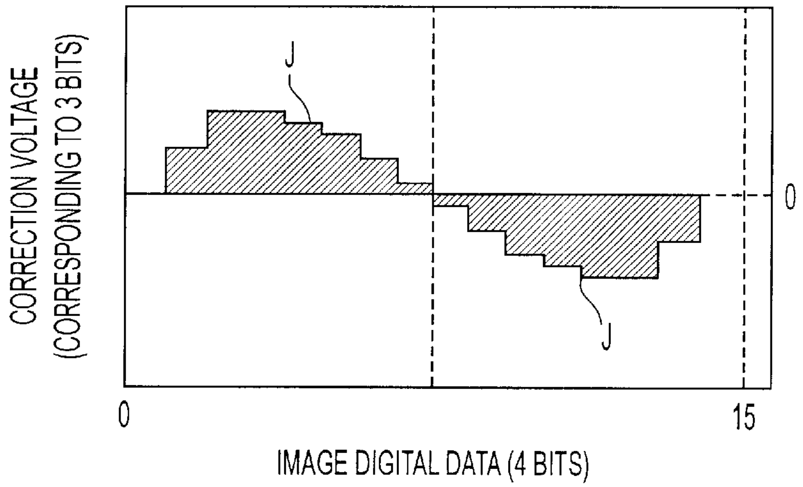
FIG. 5*b* is a graph showing the relationship between image digital data and a correction voltage.

FIG. 5A shows the relationship between image digital data (4 bits) and the applied voltage VS0 obtained in this embodiment. In FIG. 5A, H indicates an applied voltage obtained when the image digital data is directly D/A-converted, and I indicates an applied voltage obtained when γ-correction is performed. The line indicated by I is substantially symmetrical with respect to P and Q in FIG. 4A. Therefore, an applied voltage represented by I is applied to the liquid crystal, ideal characteristics Q as shown in FIG. 4A can be obtained. FIG. 5B shows an example of a correction voltage J (corresponding to 3-bit correction digital data) used in this embodiment. When the correction voltage J is added to H in FIG. 5A, the applied voltage represented by I can be obtained.

As indicated by G in FIG. 5A, in this embodiment, a relationship $V1>2\times V2$ is established where V1 corresponds to a change value of the applied voltage when the LSB of the image digital data changes; V2 corresponds to a change value of the applied voltage when the LSB of the correction digital data changes. When this relationship is established, a state wherein the applied voltage decreases with an increase in image digital data or the like can be prevented, and a normal gradation display can be performed.

In this embodiment, when the number of bits of the image digital data is set to m, and the number of bits of the correction digital data is set to n, the relationship $m\geqq n$ is established. In this manner, while a state wherein the applied voltage decreases with an increase in image digital data is prevented, the area of the capacitors of the first and second charge storage sections 202 and 204 and the area of the data driver can be reduced. More specifically, according to this embodiment, when the capacitance of the capacitor of the second charge storage section 204 is made smaller than the capacitance of the capacitor of the first charge storage section 202, $m\geqq n$ can be established. In this manner, each time the number n of bits is made smaller than the number m of bits by 1, the area of the capacitor can be made ½. According to this embodiment, when a voltage for storing a charge in the capacitor of the second charge storage section 204 is made smaller than a voltage for storing a charge in the first charge storage section 202, $m\geqq n$ can be established. In this manner, the area of the data driver can be reduced to $(n+m)/2m$. When m=6 and n=4 which may be set within a practical range, about 20% of the area can be saved.

Figure 6:
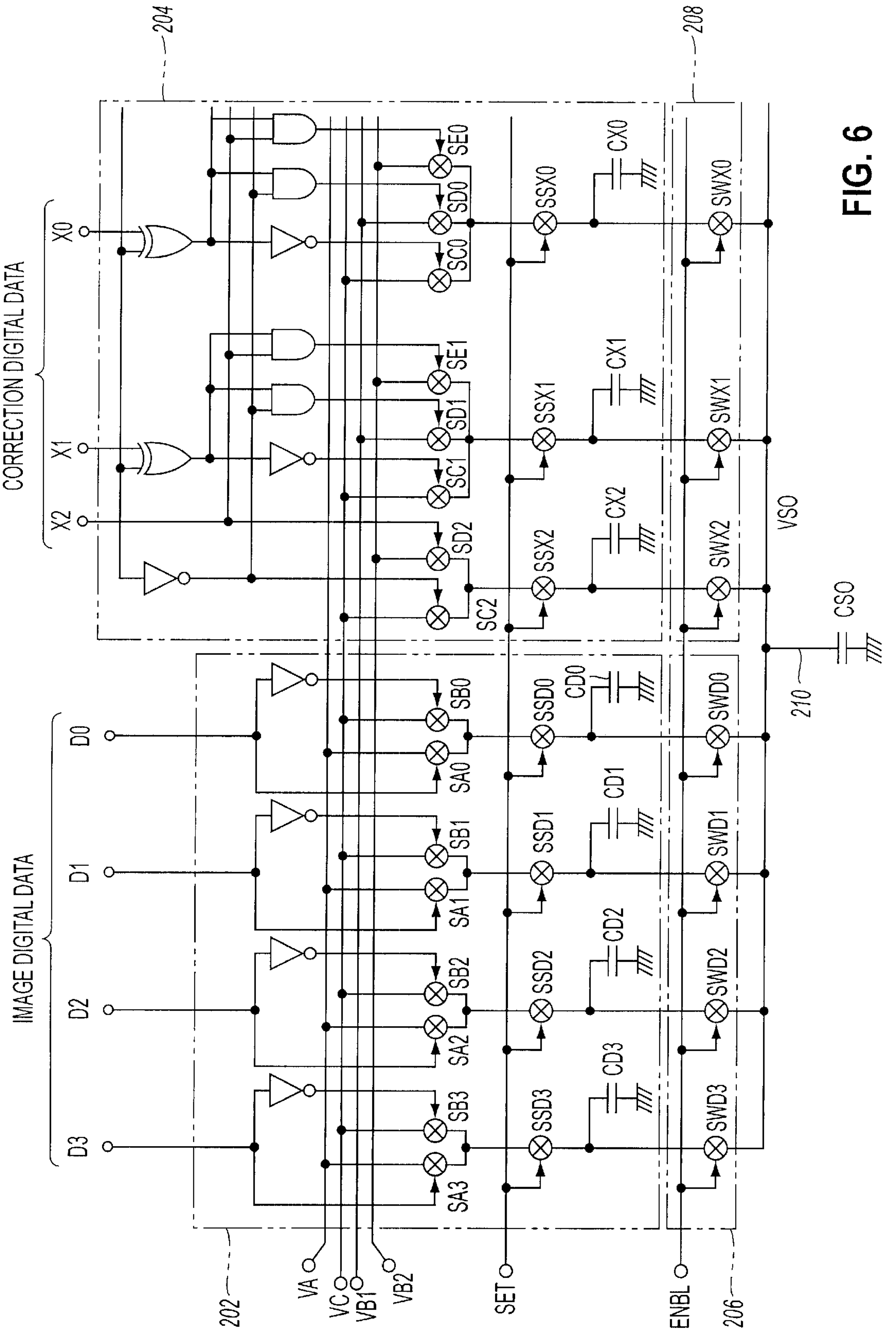
FIG. 6 is a view showing a concrete arrangement of a charge storage section and a connection section.

FIG. 6 shows a concrete arrangement of the first and second charge storage sections 202 and 204 and the first and second connection sections 206 and 208. Since this arrangement is substantially the same as the arrangement shown in FIG. 11 (to be described later), a description thereof will be omitted.

Figure 7:
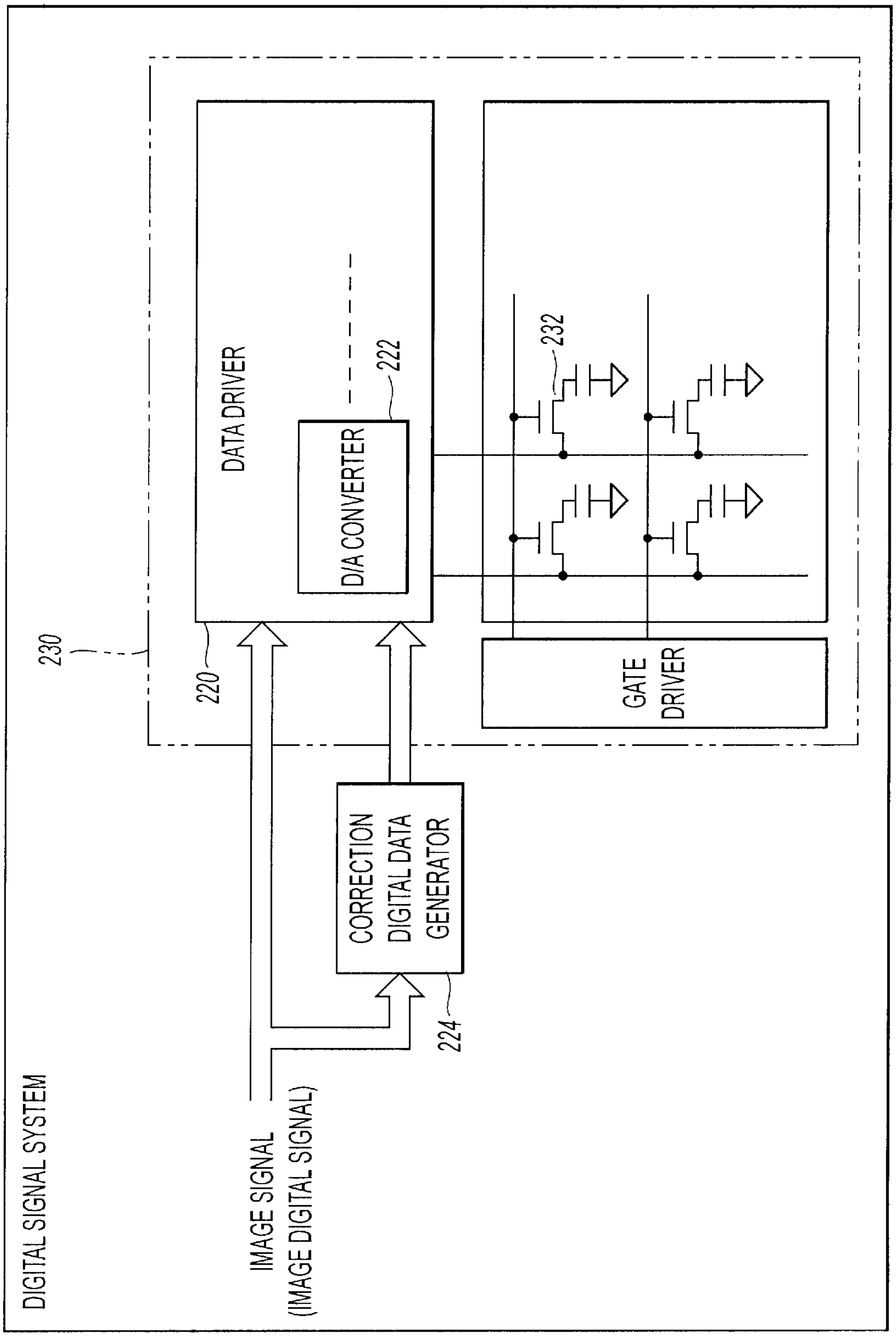
FIG. 7 is a view showing a liquid-crystal display device in which a D/A converter capable of performing γ-correction is incorporated in a data driver.

FIG. 7 shows an example of a liquid-crystal display device in which a D/A converter 222 capable of performing a correction process such as γ-correction is incorporated in a data driver 220. The liquid-crystal display device includes the data driver 220 and a substrate 230 on which at least a TFT 232 (or thin-film non-linear element) driven by the data driver 220 is formed. The data driver 220 includes the D/A converter 222 for receiving image digital data and correction digital data for compensating for the display characteristics of a liquid crystal and outputting an applied voltage subjected to a correction process. A plurality of D/A converters 222 are arranged on the signal lines, respectively. The correction digital data is generated by the correction digital data generator 224. In FIG. 7, the data driver 220 is integrally formed on the substrate 230. When the data driver 220 is integrally formed on the substrate 230 together with the TFT 232 and the like, the power consumption of the device can be considerably reduced, and the device can be reduced in scale. In particular, according to the arrangement in FIG. 7, the data driver 220 can be entirely constituted by a digital signal system. Therefore, an analog circuit need not be incorporated in the data driver 220, and the power consumption can be further reduced. A large current need not be caused to flow in the TFT constituting the circuit of the data driver 220, and a problem caused by a change in transistor characteristics of the TFT with time can be prevented. If the circuit is a digital circuit, the circuit can be operated by a TFT having relatively low performance without any problem. For this reason, a design for the circuit or the like becomes simple. When the correction digital data generator 224 is also incorporated in the data driver 220 and integrally formed on the substrate 230, the power consumption of the device can be further reduced, and the device can be reduced in scale. Note that a D/A converter having the arrangement as shown in FIG. 3 or 6 is especially preferable as the D/A converter 222 with respect to low power consumption or the like. However, a D/A converter having another arrangement may be employed.

Embodiment 3

Figure 8:
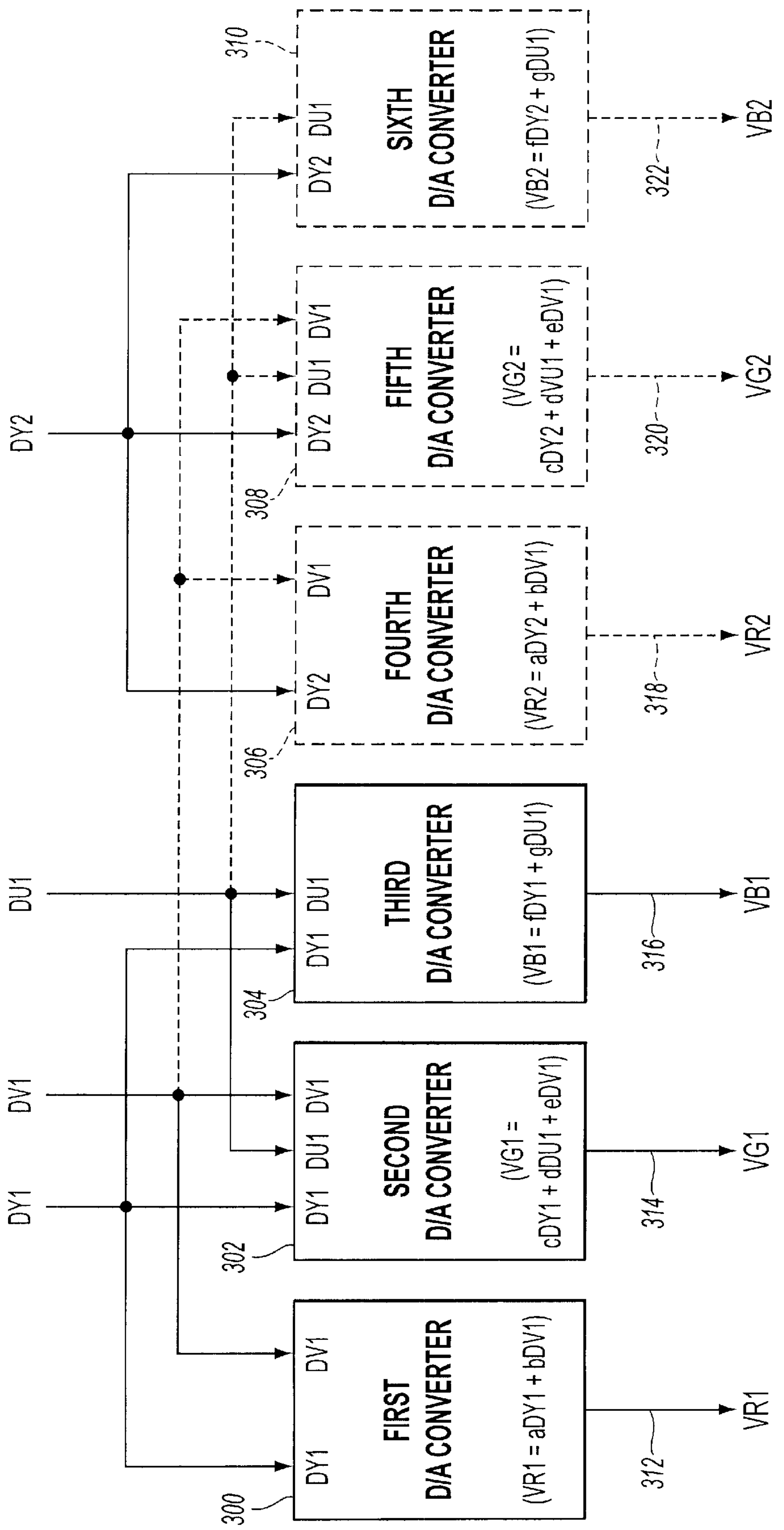
FIG. 8 is a view showing the arrangement of Embodiment 3.

Embodiment 3 is an embodiment for simultaneously performing D/A conversion and YUV/RGB conversion. The arrangement of Embodiment 3 is shown in FIG. 8. A data driver of Embodiment 3 applies voltages VR1, VG1, and VB1, generated on the basis of digital data DY1, DU1, and DV1 of a YUV signal, to signal lines 312, 314, and 316 for red, green, and blue that are electrically connected to liquid-crystal elements, respectively. The data driver includes first, second, and third D/A converters 300, 302, and 304. In this case, the first D/A converter 300 receives DY1 and DV1 to generate VR1 by conversion according to a relational expression VR1=aDY1+bDV1. The second D/A converter 302 receives DY1, DU1, and DV1 to generate VG1 by conversion according a relational expression VG1=cDY1+dDU1+eDV1. The third D/A converter 304 receives DY1 and DU1 to generate VB1 by conversion according to a relational expression VB1=fDY1+gDU1. In this case, as the arrangements of the first to third D/A converters 300 to 304, the arrangements shown in FIGS. 1, 2, or the like of Embodiment 1 are especially preferable. However, other arrangements may be used.

Here, the YUV signal is a color signal which is generally used in a television set or a video cassette recorder. Reference symbol Y indicates a total luminance (brightness) of red, green, and blue, reference symbol U indicates the color difference of red, and reference symbol V indicates the color difference of blue. In the YUV signal, it is considered that human eyes are more insensible of a change in color than of a change in luminance. That is, with respect to four pixels, Y information is given to all the four pixels, U information and V information are given to two pixels each. This scheme is called YUV422 (4:2:2). Furthermore, a scheme called YUV411 (4:1:1) in which rates of U information and V information are more reduced may be used.

In recent years, in many multi-media terminals or the like using personal computers, both the YUV and RGB signals are set. On the other hand, a RGB signal is generally used for a display of a liquid-crystal display device. Therefore, when a liquid-crystal display device is used as the display of a multi-media terminal or the like, a YUV signal must be converted into an RGB signal. As conversion equations, the following equations may be used:

$$R=Y+1.367V$$

$$G=Y-0.703125V-0.34375U$$

$$B=Y+1.7345U \quad (5)$$

where Y=0 to 255, U=−128 to 127, V=−128 to 127.

The first to third D/A converters 300 to 304 simultaneously perform the conversion expressed by the above equations and D/A conversion. More specifically, the first to third D/A converters 300 to 304 directly generate analog circuit applied voltages VR1 to VB1 for red, green, and blue from digital data DY1 to DU1 of an input YUV signal. In this manner, a circuit in the data driver can be entirely constituted by a digital system. Therefore, an analog which consumes a lot of power and is not easily designed need not be arranged, and the device can be reduced in power consumption and scale.

When the YUV422 is employed, fourth to sixth D/A converters 306 to 310 having the arrangement shown in FIG. 8 are preferably arranged. Here, the fourth to sixth D/A converter 306 receives digital data DY2 and digital data DV1 for generating applied voltages VR2, VG2, and VB2 to signal lines 318 to 322 adjacent to the signal lines 312 to 316 and generates VR2 by conversion according to a relational expression VR2=aDY2+bDV1. The fifth D/A converter 308 receives DY2, DU1, and DV1 and generates VG2 by conversion according to a relational expression VG2=cDY2+dDU1+eDV1. The sixth D/A converter 310 receives DY2 and DU1 and generates an applied voltage VB2 by conversion according to a relational expression VB2=fDY2+gDU1. As described above, when YUV422 is used, in order to obtain VR1 to VB1 and VR2 to VB2, i.e., 2 pixels×RGB applied voltages, four digital data DY1, DY2, DU1, and DV1 are given. On the other hand, when YUV411 is used, in order to obtain 4 pixels×RGB applied voltages, six digital data DY1, DY2, DY3, DY4, DU1, and DV1 may be given.

Figure 9:
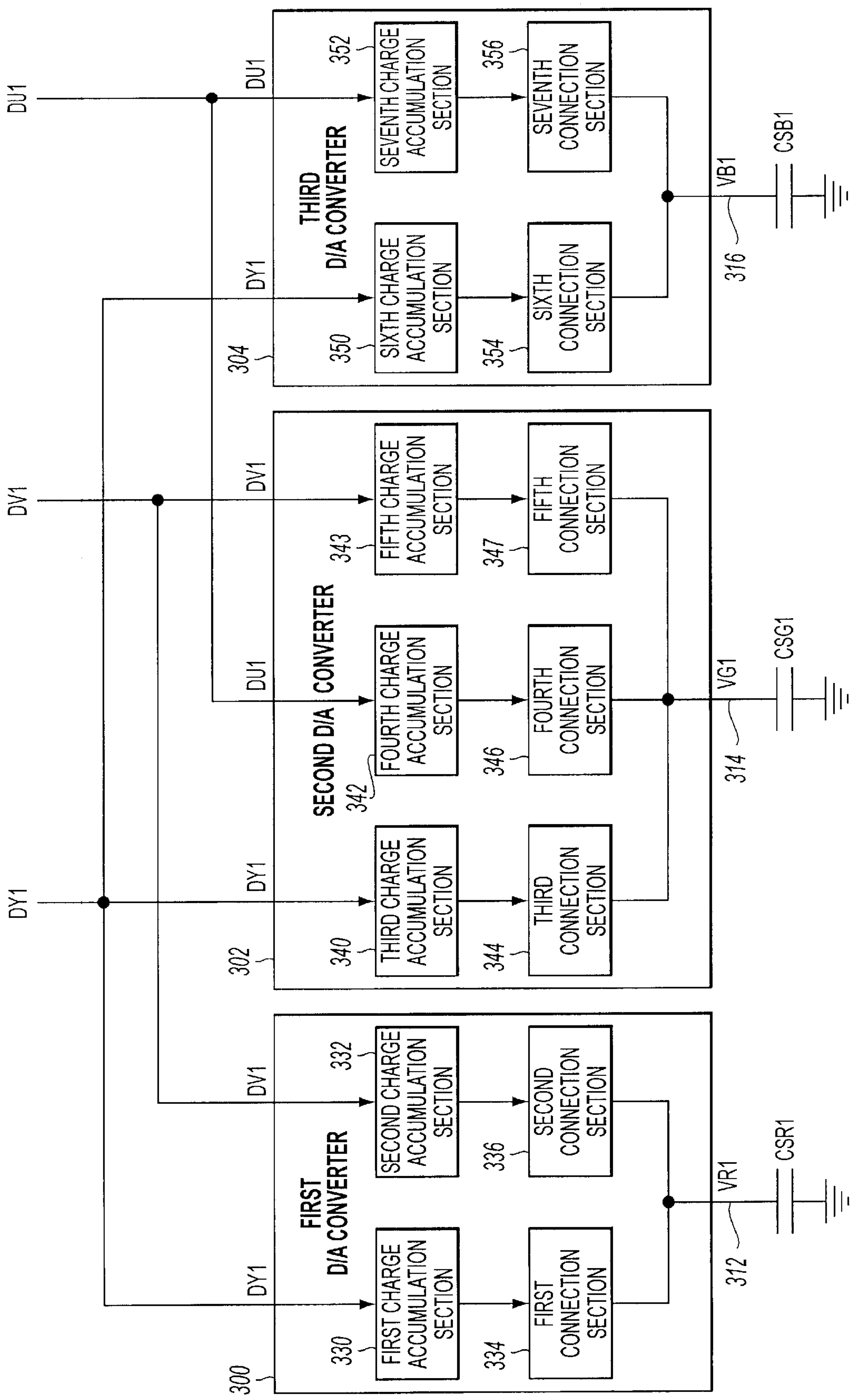
FIG. 9 is a view showing a concrete arrangement of first to third D/A converters.

FIG. 9 shows a concrete arrangement of the first to third D/A converters 300 to 304. Referring to FIG. 9, the first D/A converter 300 includes first and second charge storage sections 330 and 332 and first and second connection sections 334 and 336, the second D/A converter 302 includes third to fifth charge storage sections 340 to 343 and third to fifth connection sections 344 to 347, and the third D/A converter 304 includes sixth and seventh charge storage sections 350 and 352 and sixth and seventh connection sections 354 and 356. Since the operational principle of these charge storage sections and connection sections has been described in Embodiment 1, a description thereof will be omitted. The fourth to sixth D/A converters 306 to 310 have the same arrangement as that of the first to third D/A converters 300 to 304 except for input digital data.

Figure 10:
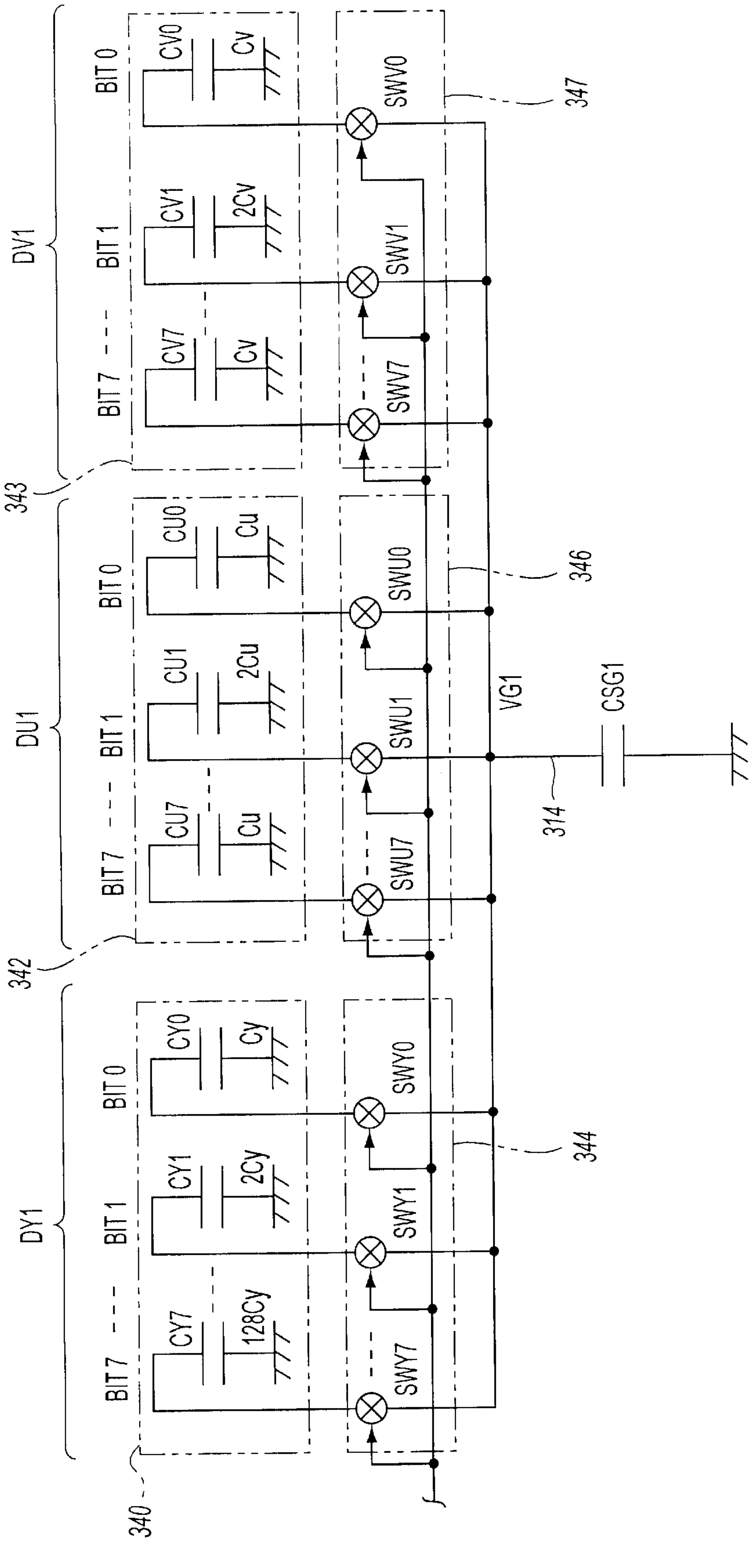
FIG. 10 is a view showing a concrete arrangement of a charge storage section and a connection section.

FIG. 10 shows another concrete arrangement of the second D/A converter 302. The third, fourth, and fifth charge storage section 340, 342, and 342 include capacitors CY7 to CY0, CU7 to CU0, and CV7 to CV0 having binarily weighted capacitances, respectively. The third, fourth, and fifth connection sections 344, 346, and 347 include switches SW7 to SW0, SWU7 to SWU0, and SWV7 to SWV0. The second D/A converter 302 performs D/A conversion and YUV/RGB conversion according to the following arithmetic equation:

$$\begin{aligned} VG1 &= cDY1 + dDU1 + eDV1 \\ &= DY1 - 0.703125DU1 - 0.34375DV1 \end{aligned} \quad (6)$$

In this embodiment, DY1, DU1, and DV1 are input in the complementary format of 2, and DU1 and DV1 have both positive and negative values. For this reason, a subtraction (addition of a negative number) process must be performed. In this embodiment, the capacitances of the capacitors CU7 and CV7 corresponding to the MBSs of DU1 and DV1 are made equal to capacitances Cu and Cv of the capacitors CU0 and CV0, respectively.

As described in Equation (6) described above, since coefficients c, d, and e of DY1, DU1, and DV1 are different from each other, the capacitances of capacitors (capacitors corresponding LSBs), voltages used in storing charges, and the like must be different from each other among the first to third charge storage sections 340 to 343. When the capacitances of the capacitors are made different from each other, for example, Cy:Cu:Cv=c:d:e must be established. However, this condition is not preferable in consideration of a variation in manufacturing process. For example, a case wherein a capacitor using a first polysilicon layer as a lower electrode, a second polysilicon layer as an upper electrode, and an insulation film between the first and second polysilicon layers as a dielectric material is formed will be considered. At this time, in order to cause the ratio of Cy to Cv to satisfy c:e=1:0.34375, the area ratio of the pattern shape on the upper electrode must satisfy c:e=1:0.34375. However, although a pattern shape having an area ratio which can be represented by integers can be easily formed, a pattern shape having an area ratio which is not represented by integers cannot be easily formed. In addition, even if the pattern is formed, the area ratio is considerably influenced by a variation in manufacturing process or the like, and a correct applied voltage cannot be easily generated.

Therefore, in this embodiment, the capacitances of capacitors corresponding to LSBs are made equal to each other (Cy=Cu=Cv), and voltages used in storing charges are made different from each other among the first to third charge storage sections 340 to 343. For example, when voltages VY, VU, and VV are used to store charges of CY7 to CY0, CU7 to CU0, and CV7 to CV0, VY:VU:VV=c:d:e is established. In this manner, the pattern shapes of the upper electrodes of, e.g., CY0, CU0, and CV0 can be made equal to each other, so that simple design can be obtained, and an influence of the variation in manufacturing process on an obtained applied voltage can be optimized. In this case, although the capacitances of, e.g., CY0 and CY1 are different from each other, this difference has no problem because the ratio of these capacitances is an integer ratio.

In order to obtain an integer capacitance ratio regardless of a variation in manufacturing process, a plurality of capacitors having upper electrodes having the same pattern shapes may be connected in parallel to each other.

Figure 11:
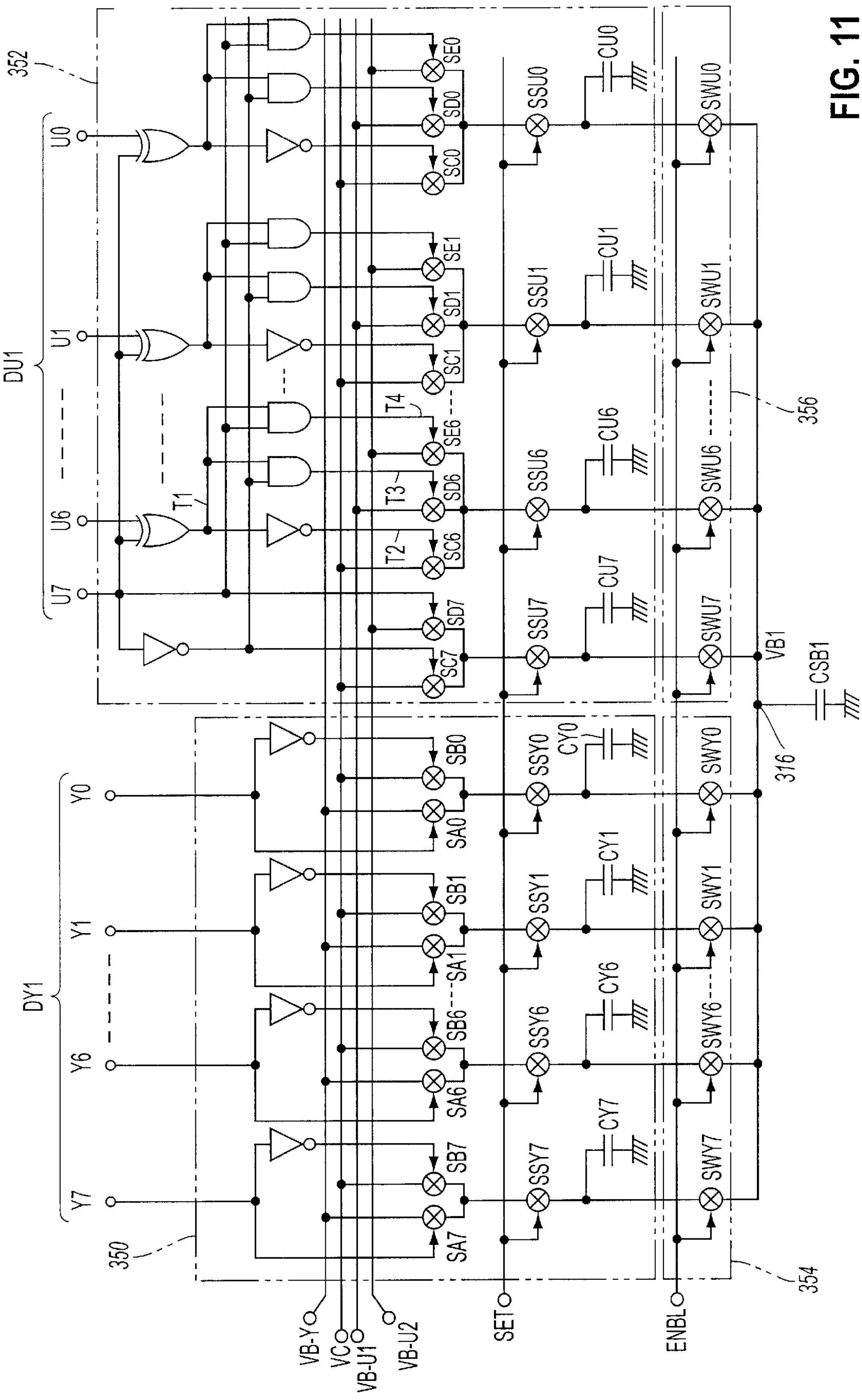
FIG. 11 is a view showing a concrete arrangement of a case wherein voltages used for charge storage are made different from each other.
Figure 12:
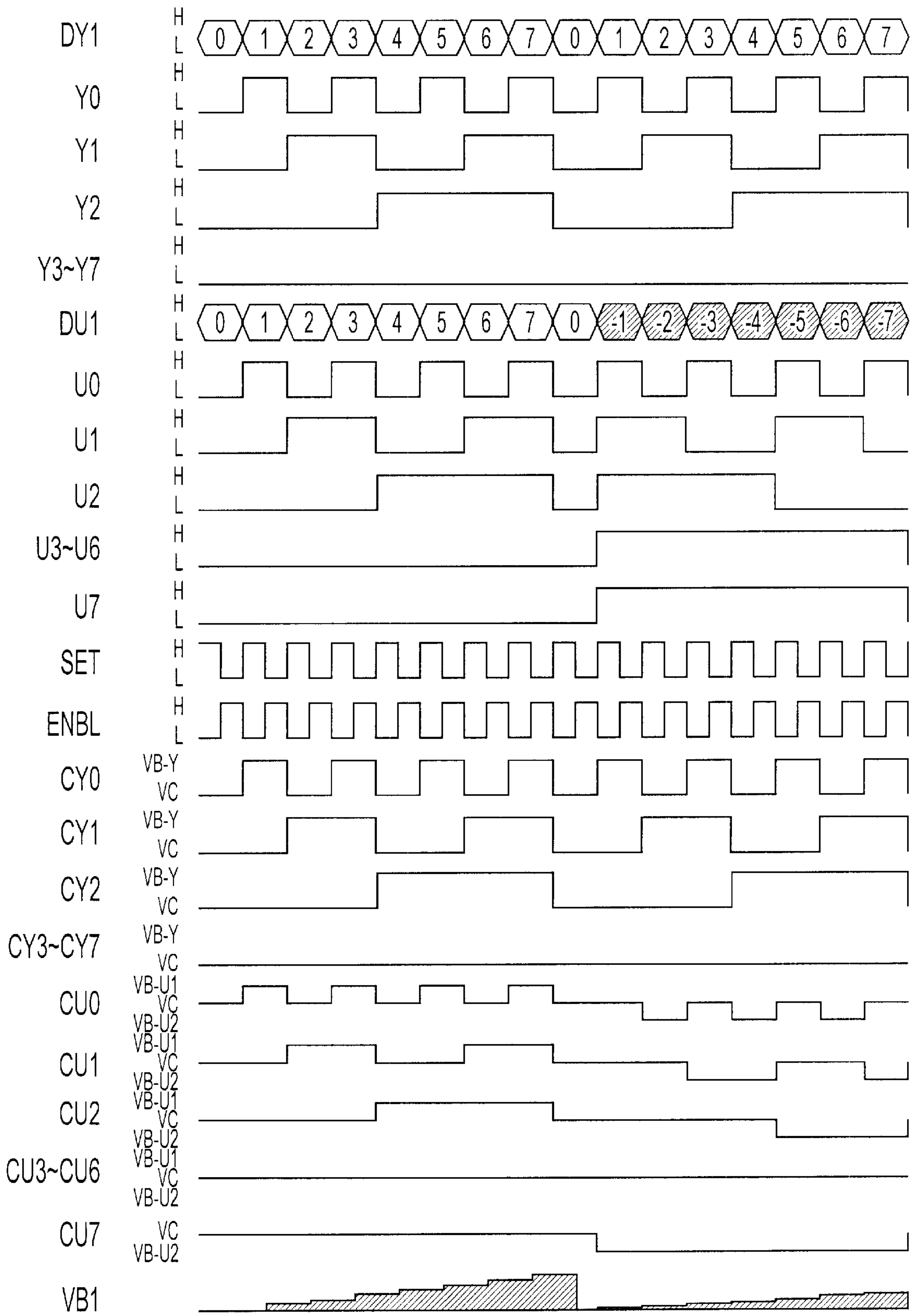
FIG. 12 is a timing chart for explaining an operation of the arrangement in FIG. 11.

FIG. 11 shows a concrete arrangement in which voltages used to store charges are made different from each other. FIG. 11 corresponds to a concrete example of the third D/A converter 304. FIG. 12 is a timing chart showing an operation of the circuit in FIG. 11, and FIGS. 13A to 13C are truth tables.

As shown in FIG. 13A, when Y7 is 0, the switch SB7 is turned on, and a voltage VC is selected; when VC=0 V, no charge is stored in CY7. In this case, VC is not necessarily set to 0 V. Note that VB-Y>VC is established, VC corresponds to an intermediate voltage between VB-U1 and VB-U2, and VB-Y-VC>VB-U1-VC=VC-VB-U2 is established (see FIG. 12).

On the other hand, when Y7 is 1, the switch SA7 is turned on, and a voltage VB-Y is selected. A charge is stored in CY7 by the voltage VB-Y.

As shown in FIG. 13B, when U7 is 0, the switch SC7 is turned on, VC is selected; when U7 is 1, the switch SD7 is turned on, and VB-U2 is selected. The voltage VB-U2 is a voltage on the negative side with reference to VC. A case wherein U7 is 1 means that the digital data DU1 in the complementary format of 2 is a negative number. When a negative number is added in the complementary format of 2, data must be inverted, and 1 (corresponding to LSB) must be added. In this embodiment, the addition of 1 is performed by the charge stored in CU7. More specifically, in this embodiment, the capacitance of CU7 corresponding to an MSB is made equal to the capacitance of CU0. When data to be added is negative, a charge is stored in CU7 by the voltage VB-U2 which is on the negative side.

As shown in FIG. 13C, both U7 and U6 are 0, the switch SC6 is turned on, and VC is selected. When U7 and U6 are 1 and 0, respectively, the switch SD6 is turned on, a charge is stored in CU6 by the voltage VB-U1 which is on the positive side, and a positive number is added. On the other hand, when U7 and U6 are 1 and 0, respectively, the switch SE6 is turned on, a charge is stored in CU6 by the voltage VB-U2 which is on the negative side, and a negative number is added. When both U7 and U6 are 1, VC is selected.

In the timing chart shown in FIG. 12, DY1 and DU1 are changed from 0 to 7 in the first half. In the second half, although DY1 is changed from 0 to 7, DU1 is changed from 0 to −7. At this time, an example of an output result is shown as VB1. A SET signal for turning on/off switches SSY7 to SSY0 and SSU7 to SSU0 and an ENBL signal for turning on/off the switches SSY7 to SSY0 and SSU7 to SSU0 alternately go to H and L as shown in FIG. 12. At this time, the SET signal and the ENBL signal are desirably set in a non-overlap state.

Figure 14:
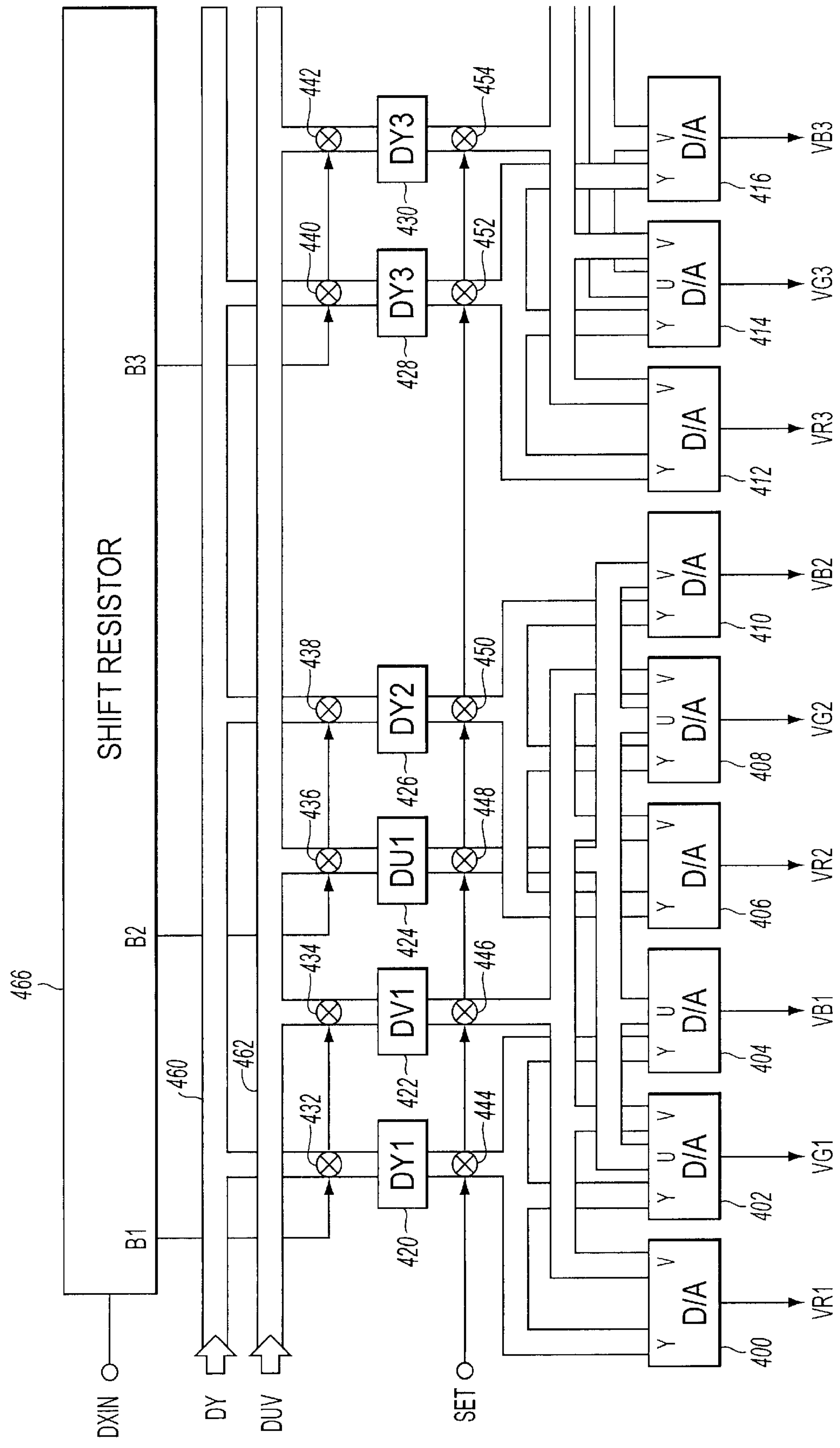
FIG. 14 is a view showing an arrangement of a peripheral circuit of a D/A converter.
Figure 15:
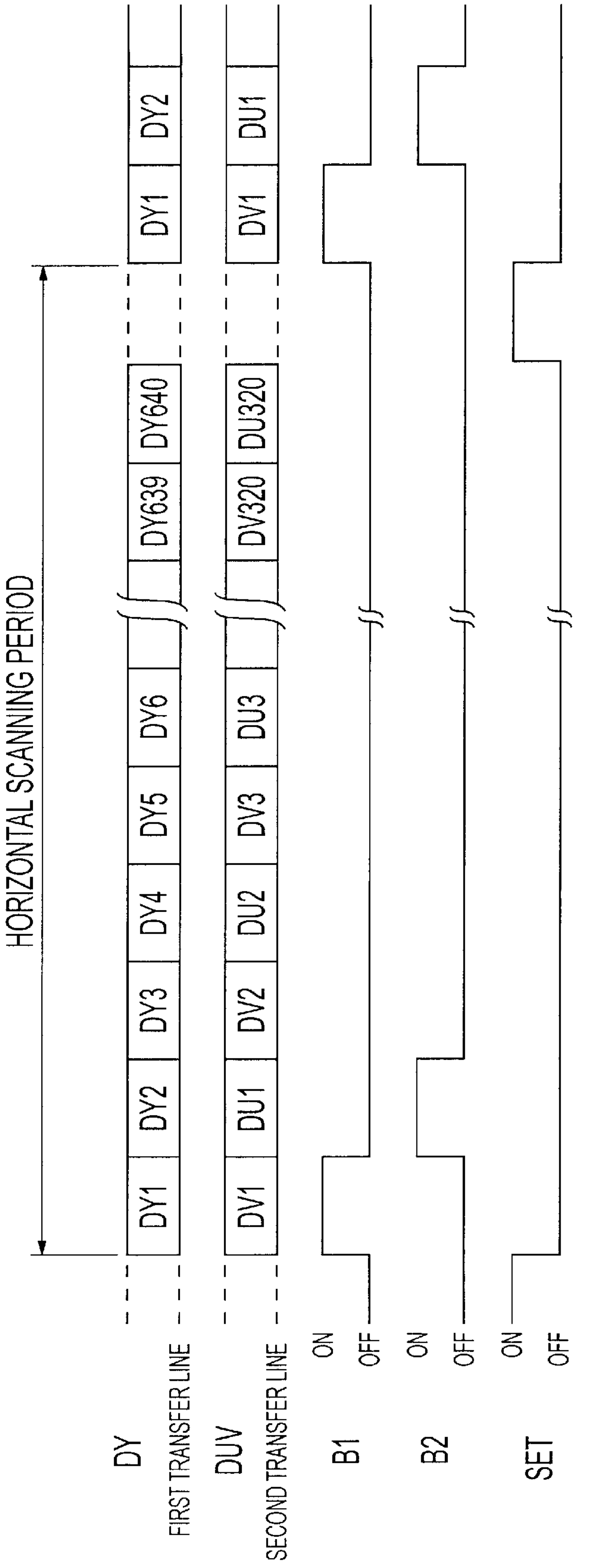
FIG. 15 is a timing chart for explaining the arrangement in FIG. 14.

FIG. 14 is an arrangement of first to sixth latches 420 to 430 and a shift resistor 466 which are peripheral circuits of first to ninth D/A converters 400 to 416, and FIG. 15 is a timing chart for explaining operations of these circuits. As shown in FIG. 15, in a first transfer line 460, digital data DY1, DY2, DY3, DY4 . . . DY2K−1, DY2K . . . DY640 of a YUV signal are sequentially transferred. On the other hand, in a second transfer line 462, digital data DV1, DU1, DV2, DU2 . . . DVK, DUK . . . DV320, DU320 of a YUV signal are sequentially transferred.

The first latch 420 latches DY2K−1 of the first transfer line 460, and the second latch 422 latches DVK of the second transfer line 462 at a timing which is substantially the same as that of the first latch 420. More specifically, switches 432 and 434 are simultaneously turned on by a signal B1 from the shift resistor 466, and, i.e., digital data DY1 and DV1 are latched by the first and second latches 420 and 422, respectively. The third latch 424 latches DUK of the second transfer line 462, and the fourth latch 426 latches DY2K of the first transfer line 460 at a timing which is substantially equal to that of the third latch 424. More specifically, switches 436 and 438 are simultaneously turned on by a signal B2 from the shift resistor 466, and, e.g., digital data DU1 and DY2 are latched by the third and fourth latches 424 and 426, respectively. The first to sixth D/A converters 400 to 410 generate first and second applied voltages VR1, VG1, VB1, VR2, VG2, and VB2 for red, green, and blue on the basis of DY2−1, DVK, DUK, and DY2K, e.g., DY1, DV1, DU1, and DY2 which are latched by the first to fourth latches 420 to 426. In this case, although the first to sixth D/A converters 400 to 410 preferably have the arrangement shown in FIGS. 8 and 9 or the like, an arrangement other than the arrangement shown in FIGS. 8 and 9 or the like may also be used.

When data is transferred and latched at a timing as shown in FIG. 15, the number of transfer lines and the number of latches can be optimized, and the device can be reduced in scale. That is, as shown in FIG. 15, the first and second transfer lines 460 and 462 can be caused to flow without any loss, and data can also be transferred to the first to sixth D/A converters 400 to 410 without any loss.

In FIG. 15, although data DV1, DU1, DV2, DU2 . . . DVK, DUK . . . DV320, and DU320 are transferred in this order, the order of DV and DU may be reversed, i.e., the DU1, DV1, DU2, DV2 . . . DUK, DVK . . . DU320, and DV320 may be transferred in this order. When YUV411 is used, latches for Du and DV are preferably arranged for each of first to fourth applied voltages for red, blue, and green, e.g., each of 4 pixels×RGB.

Figure 16:
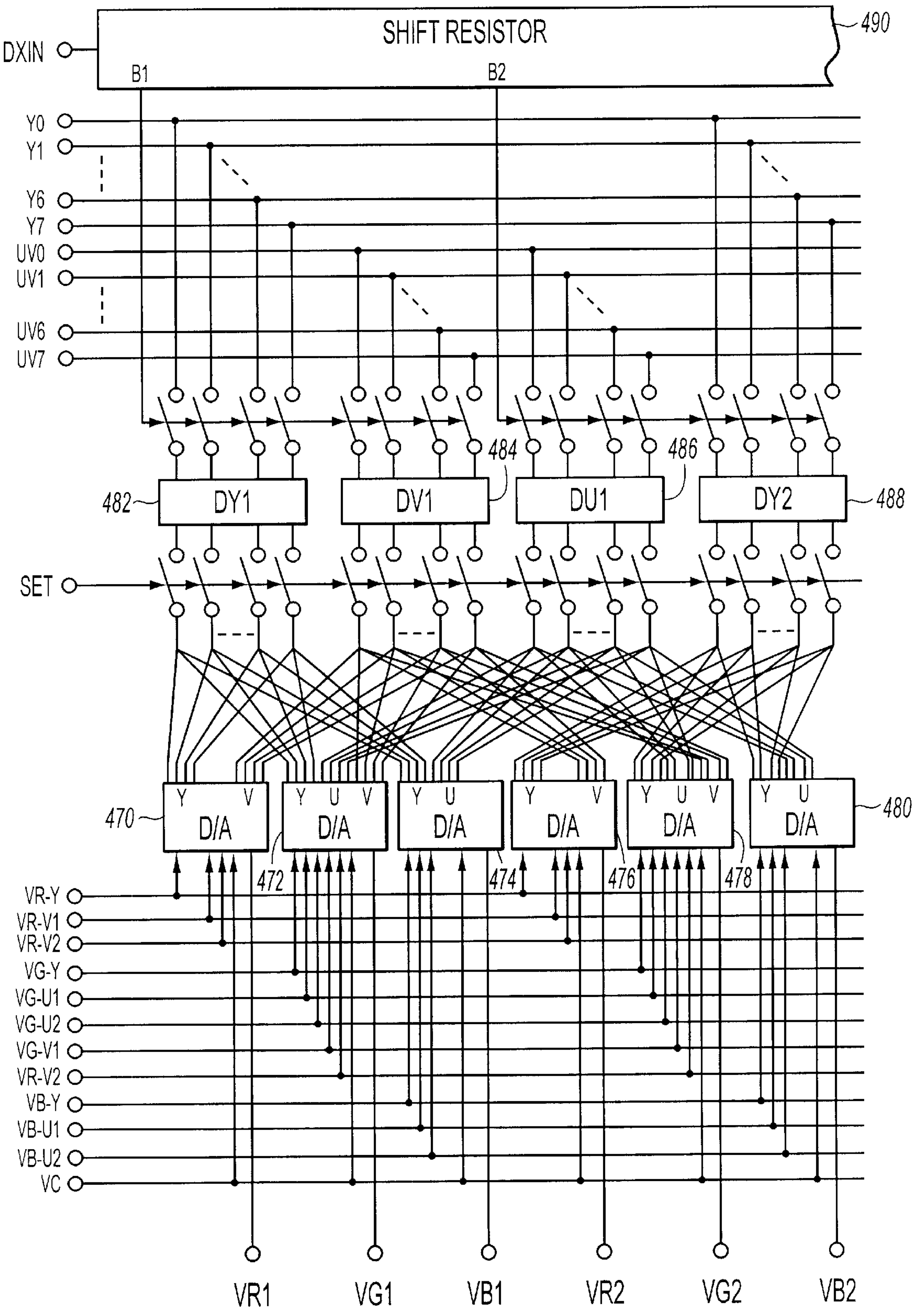
FIG. 16 is a view showing a concrete example of a wiring structure among first to sixth D/A converters, first to fourth latches, and a shift resistor.

FIG. 16 shows another concrete example of a wiring structure among first to sixth D/A converters 470 to 480, first to fourth latches 482 to 488, and a shift resistor 490. The specific characteristic feature in FIG. 16 is that, e.g., VR-Y, VR-V1, and VR-V2 are used in the first and fourth D/A converters 470 and 476 in common. In addition, VG-Y to VG-V2, VB-Y to VB-U2, and VC are used in the D/A converters in common. As described in FIG. 11, in the arrangement in FIG. 11, the values of voltages VB−Y, VC, VB−U1, and VB−U2 are adjusted to adjust coefficients by which DY1 and DU1 are multiplied. In this manner, the capacitors CY6 to CY0 and CU6 to CU0 can have the same capacitances and upper electrodes having the same patterns. CU7 is equal to CY0 and CU0. In FIG. 16, e.g., VR−Y to VR−V2 are used in the first and fourth D/A converters 470 and 476 in common, and the capacitors included in the first and fourth D/A converters 470 and 476 can be made equal to each other. Similarly, the capacitors of the second and fifth D/A converters 472 and 478 can be made equal to each other, and the capacitors of the third and sixth D/A converters 474 to 480 can be made equal to each other. In this manner, a layout pattern of the D/A converters can be regulated. As a result, the device can be reduced in scale, and a data driver which is difficult to be adversely affected by a variation in manufacturing process or the like can be provided.

Embodiment 4

Figure 17:
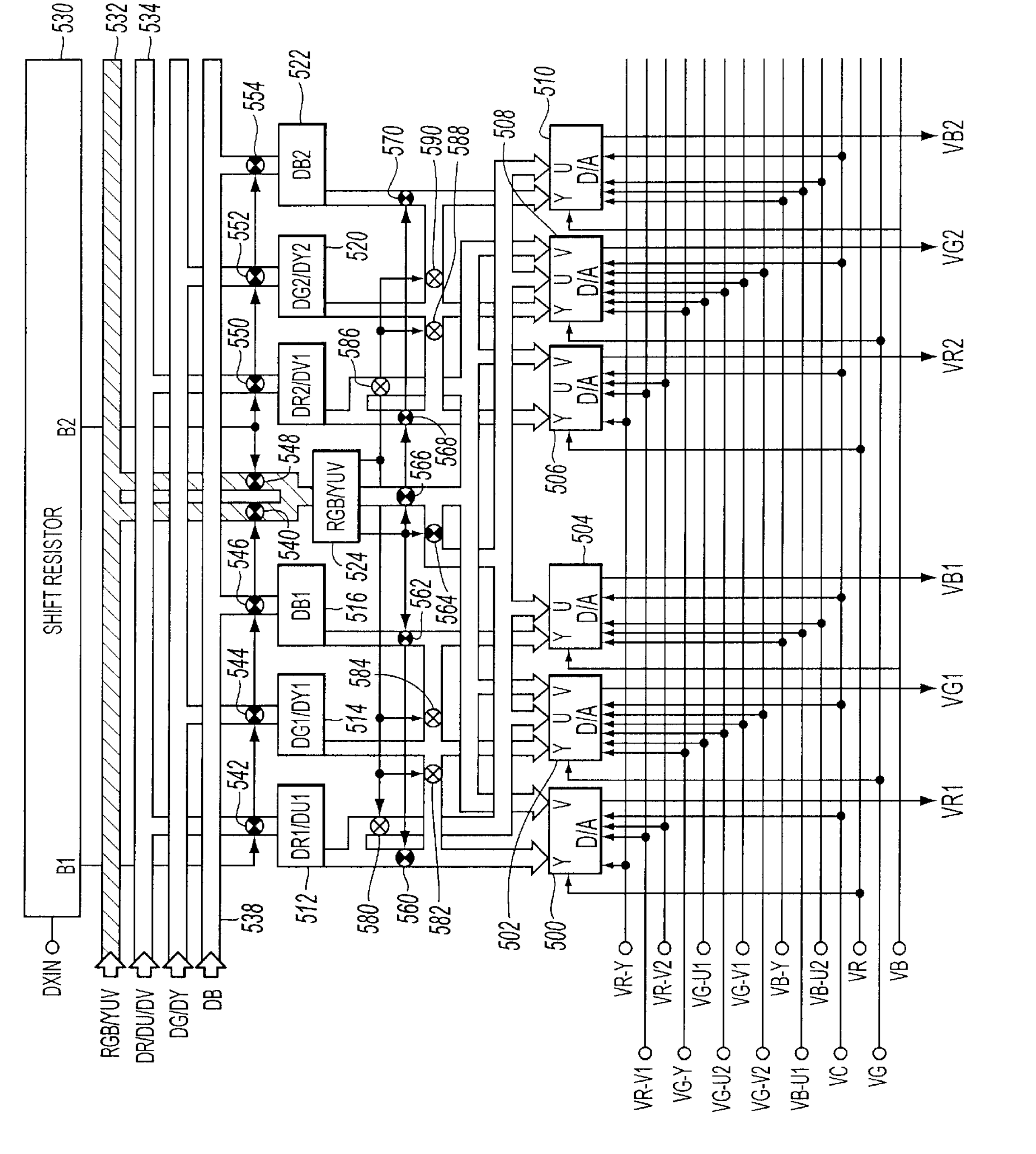
FIG. 17 is a view showing the arrangement of Embodiment 4.

FIG. 17 shows an arrangement of Embodiment 4. Embodiment 4 is an embodiment related to a data driver comprising a mode (to be referred to as a YUV mode hereinafter) for converting digital YUV into analog RGB and a mode (to be referred to as an RGB mode hereinafter) for converting digital RGB into analog RGB. More specifically, as shown in FIG. 17, in Embodiment 4, digital data of an RGB signal is further given. Embodiment 4 comprises a YUV mode for generating applied voltages VR1, VG1, VB1, VR2, VG2, and VB2 on the basis of the digital data DY1, DU1, DV1, and DY2 and an RGB mode for generating applied voltages VR1, VG1, VB1, VR2, VG2, and VB2 on the basis of the digital data DR1, DG1, DB1, DR2, DG2, and DB2.

In the RGB mode, data input to first to sixth D/A converters 500 to 510 are switched as described below. More specifically, DR1 is input to the first D/A converter 500 in place of DY1 and DV1. DG1 is input to the second D/A converter 502 in place of DY1, DU1, and DV1. DB1 is input to the third D/A converter 504 in place of DY1 and DU1. Similarly, DR2, DG2, and DB2 are input to the fourth, fifth, and sixth D/A converters 506, 508, and 510 in place of DY2 and DV1, DY2, DY1, and DV1, and DY2 and DU1, respectively.

The above switching process will be further described below. In a first transfer line 532, data (to be referred to as RGB/YUV data hereinafter) for determining whether a target image signal is an RGB signal or a YUV signal is transferred. DR, DU, and DV are transferred in a second transfer line 534, DG and DY are transferred in a third transfer line 536, and DB is transferred in a fourth transfer line 538. The switches 540 to 546 are turned on by a B1 signal from a shift resistor 530, so that data flowing in the first to fourth transfer lines 532 to 538 are latched by an RGB/YUV switching circuit 524 and first to third latches 512 to 516. Switches 548 to 554 are turned on by a B2 signal from the shift resistor 530, and data flowing in the first to fourth transfer lines 532 to 538 are latched by the RGB/YUV switching circuit 524 and fourth to sixth latches 518 to 522.

In the YUV mode, DU1, DY1, DV1, and DY2 are latched by the first, second, fourth, and fifth latches 512, 514, 518, and 520, respectively. When the RGB/YUV switching circuit 524 is controlled, switches 560, 562, 564, 566, 568, and 570 are turned off, and switches 580, 582, 584, 586, 588, and 590 are turned on. In this manner, the same signal connection relationship as in FIG. 14 is obtained, and, as in the case shown in FIG. 14, desired digital data are input to the first to sixth D/A converters 500 to 510. A conversion process for converting digital YUV into analog applied voltages VR1 to VB1 and VR2 to VB2 is performed.

On the other hand, in the RGB mode, DR1, DG1, DB1, DR2, DG2, and DB2 are latched by fourth to sixth latches 512 to 522. When the RGB/YUV switching circuit 524 is controlled, the switches 580 to 590 are turned off, and switches 560 to 570 are turned off. In this manner, RGB digital data are input to the first to sixth D/A converters 500 to 510. A conversion process of converting digital RGB into the analog applied voltages VR1 to VB1 and VR2 to VB2 is performed.

According to this embodiment, both digital YUV and digital RGB can be handled. Therefore, digital YUV and RGB can be directly received from a multi-media terminal in which both YUV and RGB are set, a graphic accelerator, or the like without using a D/A converter or the like, and an analog applied voltage can be generated. In this manner, the data driver can be entirely constituted by a digital system, and the device can be reduced in power consumption and scale.

Embodiment 5

Figure 18:
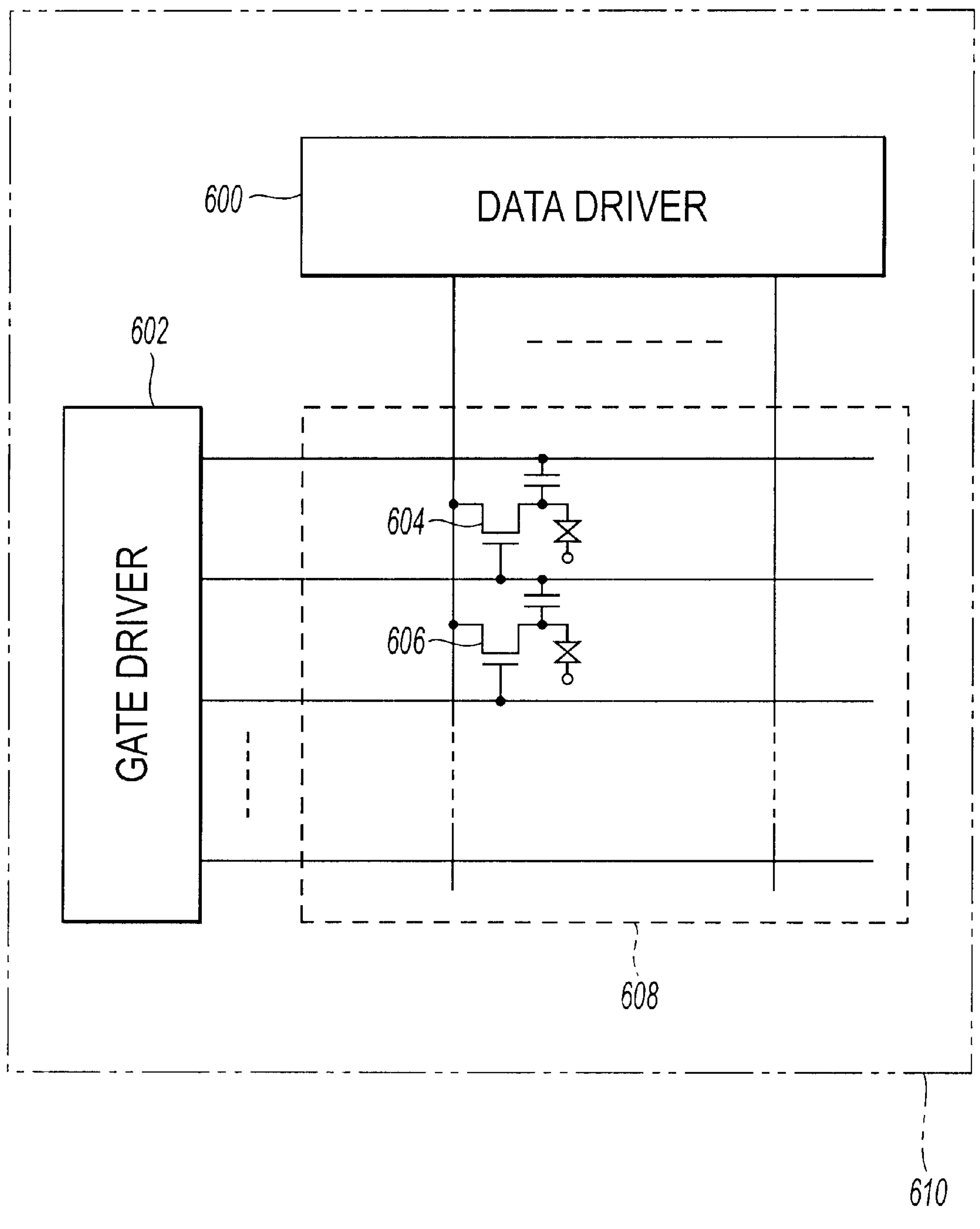
FIG. 18 is a view showing the arrangement of a liquid-crystal display device according to Embodiment 5.

Embodiment 5 is an embodiment related to a liquid-crystal display device integrally formed on a substrate on which a TFT is formed. Referring to FIG. 18, a data driver 600 is a data driver being capable of performing the $\gamma$-correction described above, YUV/RGB conversion, and simultaneous use of YUV and RGB, and the like. In FIG. 18, the data driver 600, a gate driver 602, an active matrix section 608 (TFTs 604 and 606 are arranged in a matrix) are integrally formed on a substrate 610. When these circuits are integrally formed on the substrate 610, the liquid-crystal display device can be reduced in outside dimension and cost.

Figure 19A:
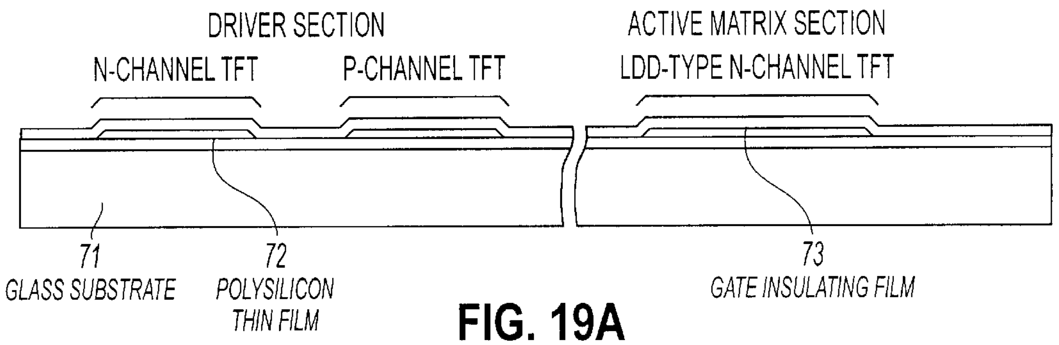
FIGS. 19A to 19E are sectional views showing steps performed when a data drive is integrally formed on a substrate.

FIGS. 19A to 19E are sectional views showing the steps when the data driver 600 or the like is constituted by a CMOS self-align-type polysilicon TFT, and the active matrix section 608 is constituted by an LDD-type polysilicon TFT. As shown in FIG. 19A, an insulating film for preventing an insulating material from being diffused from the substrate is deposited on a glass substrate 71, and a polysilicon thin film 72 is deposited on the insulating film. The crystallinity of the polysilicon thin film 72 must be improved to increase field-effect mobility. Therefore, a polysilicon thin film is recrystallized by using laser annealing, solid-phase growing method, or the like, or a film obtained by crystallizing an amorphous silicon thin film into a polysilicon film is used. After the polysilicon thin film 72 is patterned to have an island shape, a gate insulating film 73 is deposited.

Figure 19B:
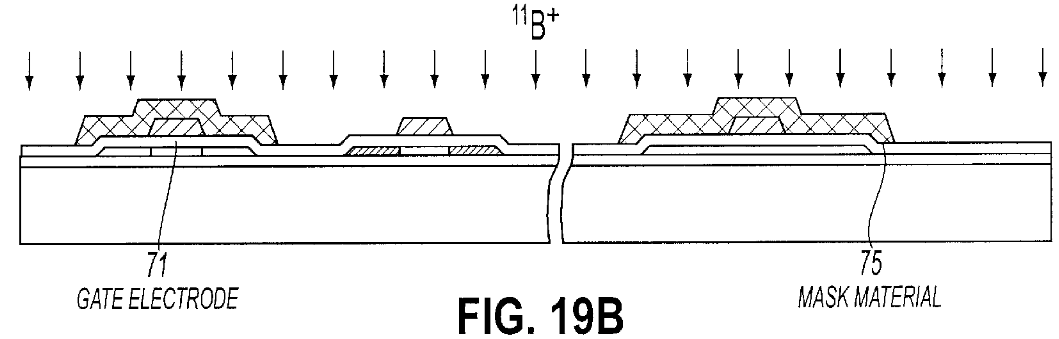

As shown in FIG. 19B, after a gate electrode 74 is formed, a portion serving as an N-channel TFT is covered with a mask material 75, boron ions are doped at a high concentration to form a sourcexdrain portion of a P-channel TFT.

Figure 19C:
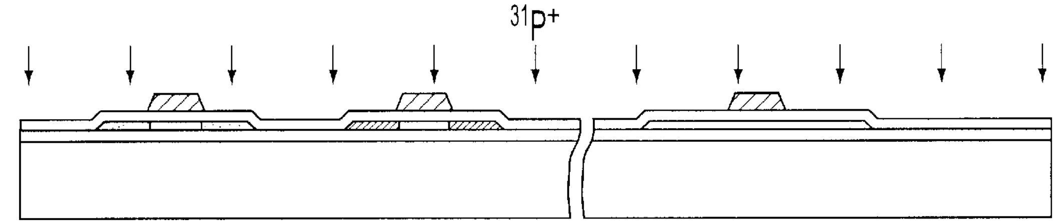
Figure 19D:
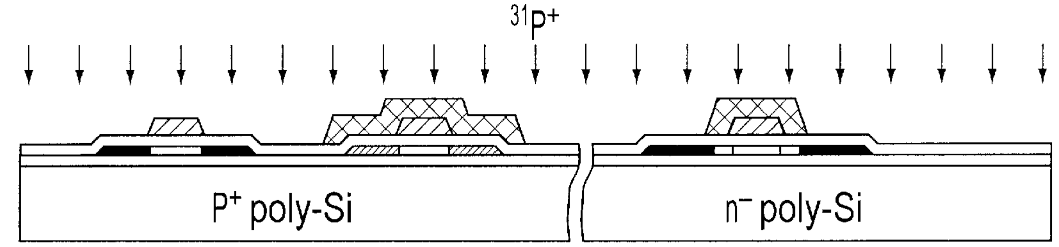

As shown in FIG. 19C, the mask material is removed, and phosphorous ions are doped in the front surface at a low concentration. In addition, as shown in FIG. 19D, a portion serving as a P-channel TFT and the LDD portion of pixel TFTs are covered with a mask material, and phosphorous ions are doped at a high concentration. The TFTs of the active matrix section (pixel section) has an arrangement in which an LDD portion constituted by an n-type high-resistance polysilicon thin film ($n^-$poly-si) is formed between a sourcexdrain portion constituted by an n-type low-resistance polysilicon thin film ($n^-$poly-si). In this manner, the OFF current of the TFTs of the active matrix section are suppressed to be sufficiently low, and generation of crosstalk or the like can be prevented.

Figure 19E:
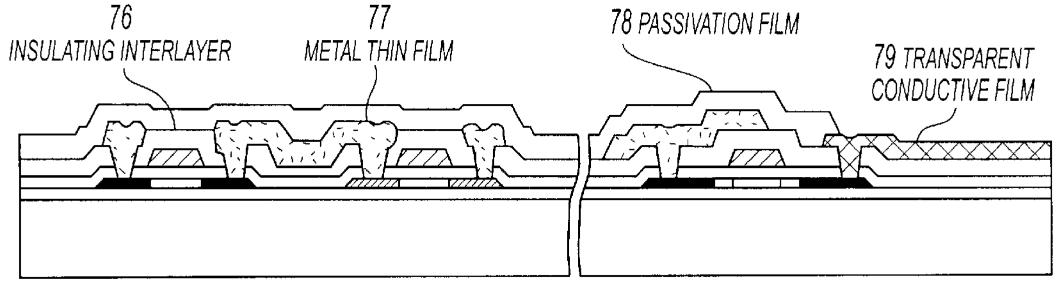

Finally, as shown in FIG. 19E, an insulating interlayer 76 is formed, and a wiring structure is constituted by a metal thin film 77, pixel electrodes are constituted by a transparent conductive film 79 or the like, and a passivation film 78 is formed. As a result, an active matrix substrate in which a data driver is integrally formed is completed. The substrate is subjected to an aligning process, and a counter substrate subjected to the same aligning process is caused to oppose the substrate. A liquid crystal is sealed between these substrates, so that a liquid crystal display device is completed.

Embodiment 6

Figure 20:
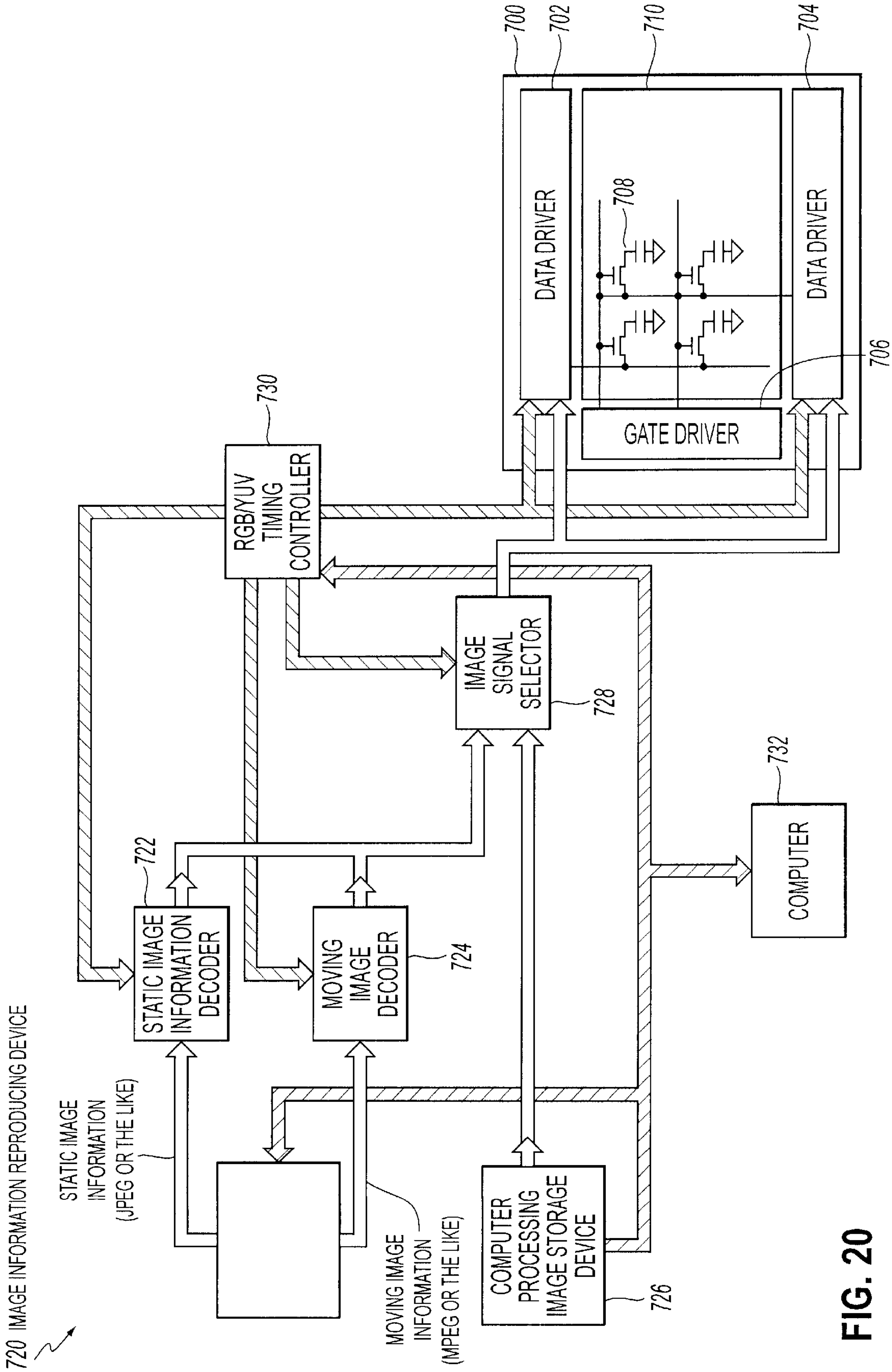
FIG. 20 is a view showing the arrangement of information processing apparatus according to Embodiment 6.
Figure 21:
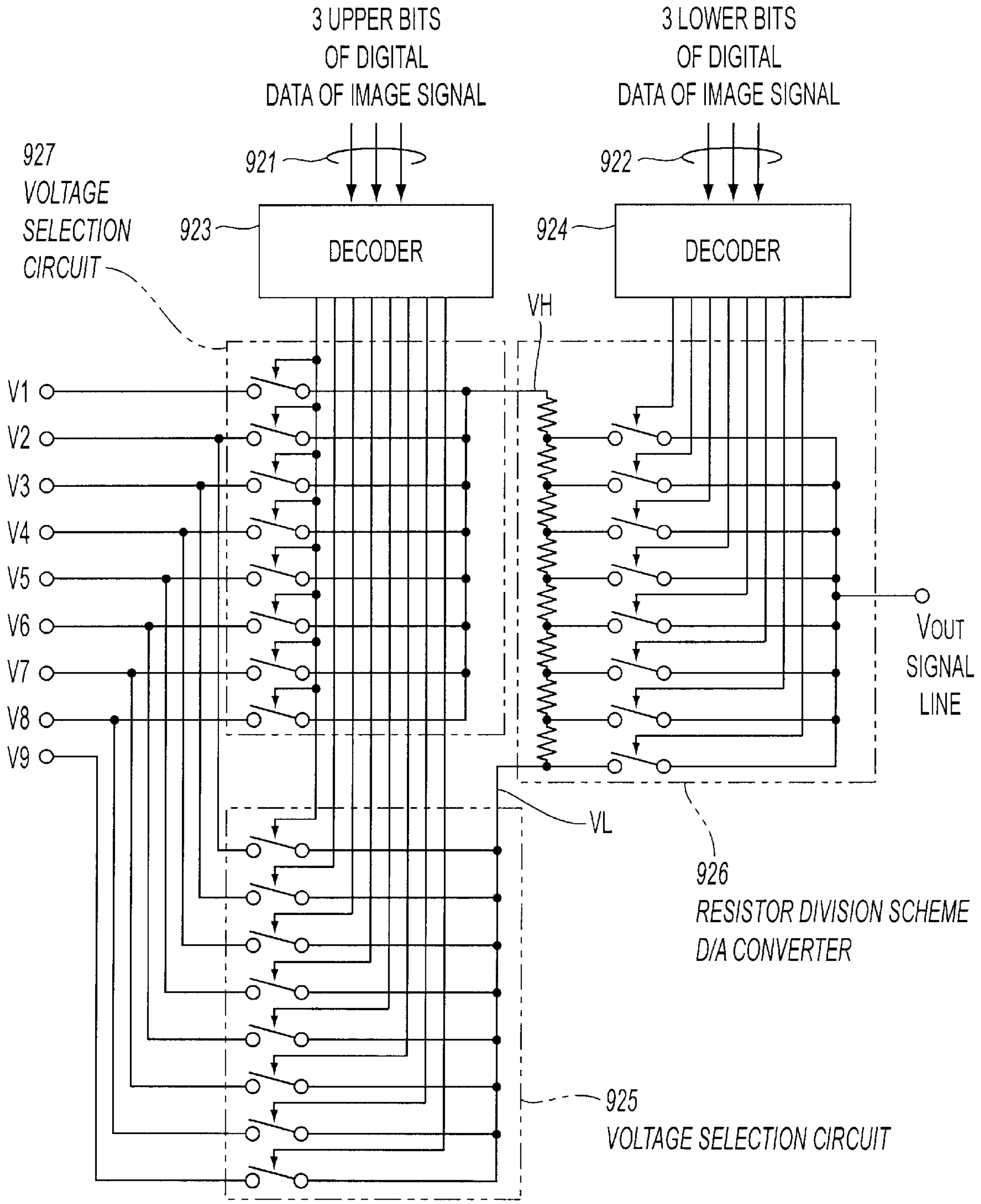
FIG. 21 PRIOR ART
FIG. 21 is a view showing a D/A converter incorporated in a conventional data driver.
Figure 22:
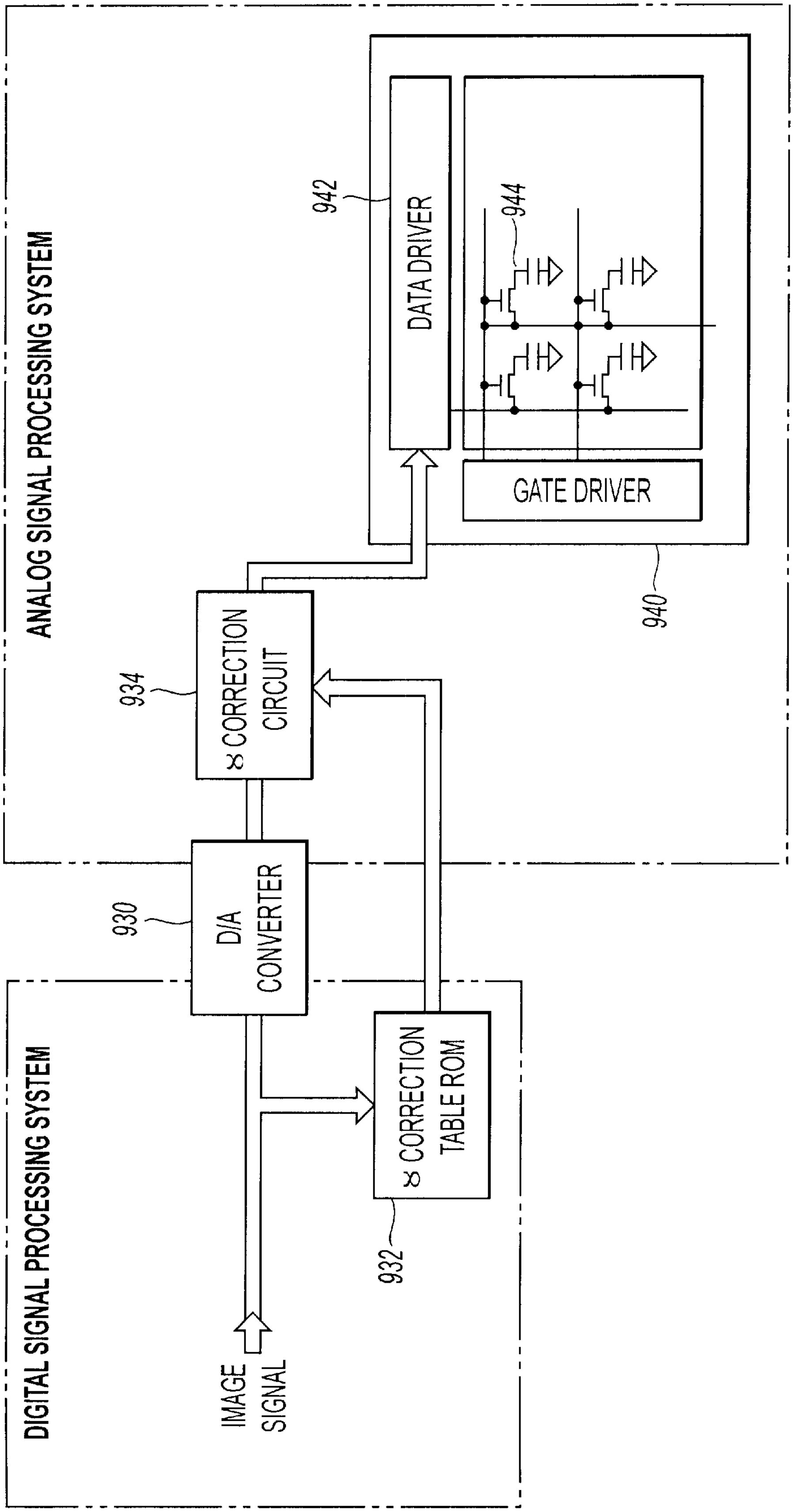
FIG. 22 PRIOR ART
FIG. 22 is a view showing a case wherein γ-correction is performed using an analog-type data driver.
Figure 23:
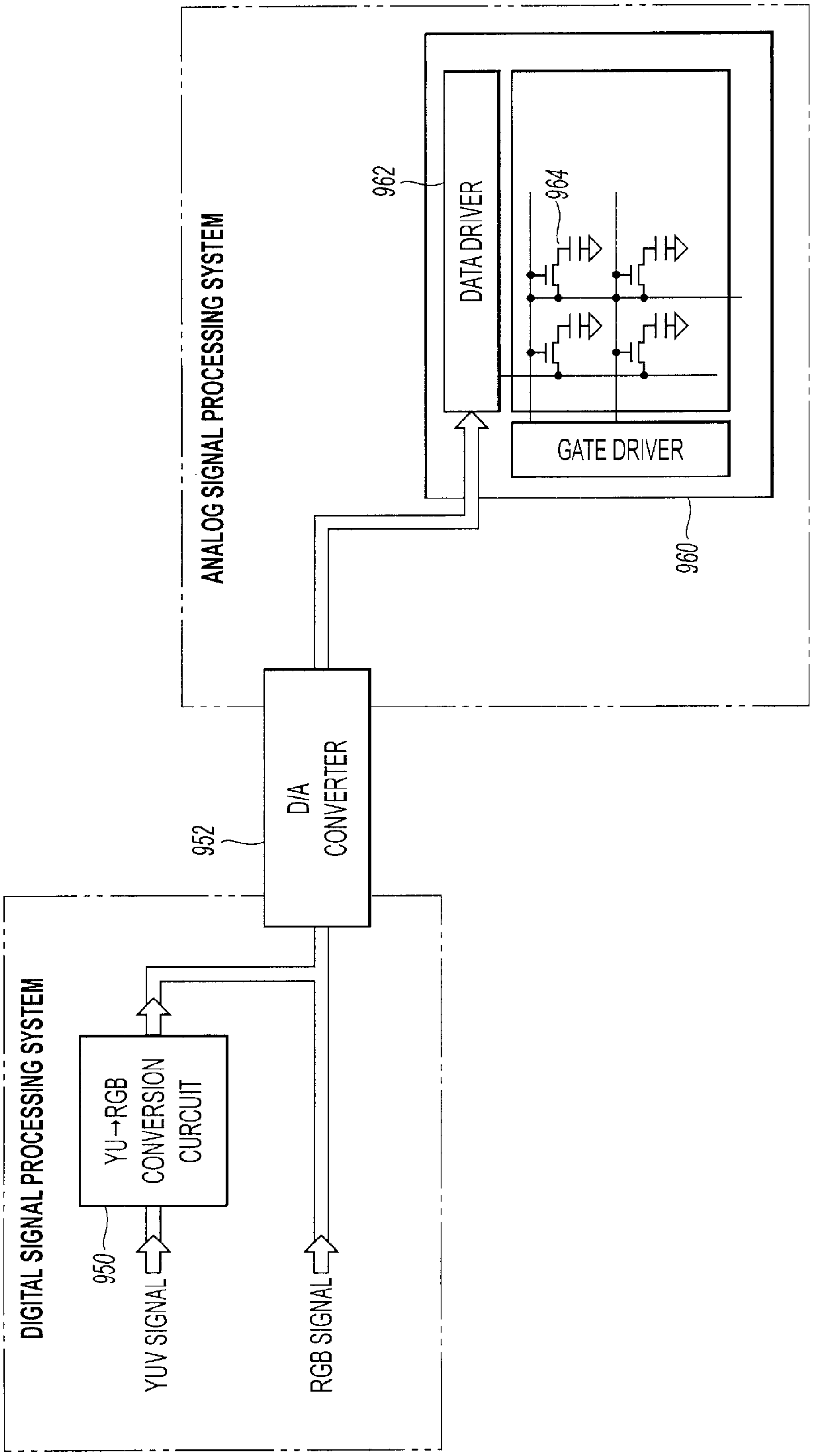
FIG. 23 PRIOR ART
FIG. 23 is a view for explaining conventional YUV/RGB conversion.

Embodiment 6 is an embodiment related to an information processing apparatus (multi-media terminal or the like) including a liquid-crystal display device and an image signal output device for outputting an image signal given to the liquid-crystal display device. FIG. 20 shows an arrangement of Embodiment 6.

A liquid-crystal display device 700 includes an active matrix section 710 in which data drivers 702 and 704, a gate driver 706, a TFT 708, and the like are formed. As an image information reproducing device 720, for example, a DVD, a CD-ROM, a digital video cassette recorder, or the like may be used. Static image information of, e.g., the JPEG standards output from the image information reproducing device 720 is input to a static image information decoder 722. The static image information decoder 722 decodes the static image information which is subjected to compression or the like of the JPEG standards to output a digital YUV signal. Similarly, moving image information of, e.g., the MPEG standards output from the image information reproducing device 720 is input to a moving image information decoder 724. The moving image information decoder. 724 decodes the moving image information which is subjected to compression or the like of the MPEG standards to output a digital YUV signal. On the other hand, as a computer processing image storage device 726, a VRAM or the like may be used. A digital RGB signal is output from the computer processing image storage device 726.

A digital YUV signal output from a first image signal output device (the image information reproducing device 720, the static image information decoder 722, and the moving image information decoder 724) and a digital RGB signal output from a second image signal output device (the computer processing image storage device 726) are input to an image signal selector 728. One of the YUV signal and the RGB signal is selected to be input to the data drivers 702 and 704. Input/output timings of the signals are controlled by an RGB/YUV timing controller 730 and a computer 732.

The data drivers 702 and 704 include means which, when digital data of the YUV signal is input, directly convert the digital data into analog applied voltages for red, green, and blue to output the analog applied voltages and, when digital data of the RGB signal is input, convert the digital data into analog applied voltages for red, green, and blue to output the applied voltage. As such means, means having the arrangement described in FIG. 17 is especially preferable. However, means having an arrangement other than the arrangement can be employed. When the means is arranged in the data driver, the data driver can be entirely constituted by a digital-base circuit, and the device can be reduced in power consumption, scale, and the like.

It is preferable to integrally form the data drivers 702 and 704 and the gate driver 706 on a substrate on which the active matrix 710 is formed. In addition, the static image information decoder 722, the moving image information decoder 724, the image signal selector 728, and the RGB/YUV timing controller 730 may be incorporated in a data driver, so that the data driver may be integrally formed on a substrate on which the active matrix 710 is formed.

The present invention is not limited to Embodiments 1 to 6 described above, and various modified embodiments can be effected within the range of the spirit and scope of the invention.

For example, the above embodiments describe a case wherein the present invention is applied to γ-correction of a liquid crystal and YUV/RGB conversion. However, the present invention can be applied to other various conversion processes.

The present invention can also be applied to a display element driving device other than a data driver, a display device other than a liquid-crystal display device, and an information processing apparatus other than a multi-media terminal. In addition, the present invention can be applied to not only active-matrix-type liquid-crystal display devices using thin-film transistors, thin-film non-linear elements (e.g., MIMs), and the like and data drivers for the active-matrix-type liquid-crystal display devices, but also all liquid-crystal display devices including simple-matrix-type liquid-crystal display devices and data drivers for the liquid-crystal display devices.

What is claimed is:

1. A display element driving device comprising:

a D/A converter for applying a voltage based on a given image signal to an electrode line that is electrically connected to a capacitive display element having one side to which a given voltage is applied, wherein said D/A converter includes:

first charge storage means for receiving image digital data corresponding to the image signal and for storing a charge corresponding to a value of the image digital data;

second charge storage means for receiving correction digital data for compensating for display characteristics of said display element and for storing a charge corresponding to a value of the correction digital data;

first connection means for electrically connecting said first charge storage means to said electrode line and for discharging the charge stored in said first charge storage means to said electrode line at a given timing; and second connection means for electrically connecting said second charge storage means to said electrode line and for discharging the charge stored in said charge storage means to said electrode line at a substantially same timing as the given timing.

2. The display element driving device according to claim 1, wherein when a change value of the applied voltage obtained when a least significant bit of the image digital data changes is represented by V1, and a change value of the applied voltage obtained when a least significant bit of the correction digital data changes is represented by V2, a relationship of $V1>2\times V2$ is established.

3. The display element driving device according to claim 1, wherein when the number of bits of the image digital data is represented by m, and the number of bits of the correction digital data is represented by n, then a relationship of $m\geqq n$ is established.

4. A display device comprising:

a display element driving device, the display element driving device including a D/A converter, the D/A converter having a first section for receiving image digital data and a second section for receiving correction digital data for compensating the image digital data for a display characteristic of the display element;

a display element driven by said display element driving device; and a substrate on which a switching element selecting a display element and including a thin-film transistor or a thin-film non-linear element is formed, an output voltage from the D/A converter based on the image digital data and correction digital data being applied to an electrode line, and said display element driving device being integrally formed on said substrate.

5. An information processing apparatus comprising said display device according to claim 4 and at least one image signal output device for outputting an image signal to said display device.

6. A display device comprising:

a display element driving device, the display element driving device including a D/A converter, the D/A converter having a first section for receiving image digital data and a second section for receiving correction digital data for compensating the image digital data for a display characteristic of the display element; and a display element driven by the display element driving device, an output signal from the D/A converter based on the image digital data and the correction digital data being supplied to the display element through an electrode line.

7. A display element driving method for applying a voltage based on a given image signal to an electrode line electrically connected to a capacitive display element having one side to which a given voltage is applied, the method comprising the steps of:

inputting image digital data corresponding to the image signal to first charge storage means, and storing a charge corresponding to a value of the image digital data in said first charge storage means;

inputting correction digital data for compensating for display characteristics of said display element to second charge storage means, and storing a charge corresponding to a value of the correction digital data in said second charge storage means, wherein said first charge storage means is electrically connected to said electrode line and the charge stored in said first charge storage means is discharged to said electrode line at a given timing, said second charge storage means and said electrode line are electrically connected to each other, and the charge stored in said charge storage means is discharged to said electrode line at a same timing as the given timing.

8. A display element driving device comprising:

a D/A converter for applying a voltage based on a given image signal to an electrode line that is electrically connected to a capacitive display element having one side to which a given voltage is applied, wherein said D/A converter includes:

first charge storage capacitor that receives image digital data corresponding to the image signal and that stores a charge corresponding to a value of the image digital data;

second charge storage capacitor that receives correction digital data for compensating for display characteristics of said display element and that stores a charge corresponding to a value of the correction digital data;

first switch that electrically connects said first charge storage capacitor to said electrode line and that discharges the charge stored in said first charge storage capacitor to said electrode line at a given timing; and second switch that electrically connects said second charge storage capacitor to said electrode line and that discharges the charge stored in said charge storage capacitor to said electrode line at a substantially same timing as the given timing.

* * * * *